United States Patent
Sato et al.

(10) Patent No.: US 9,494,798 B2
(45) Date of Patent: Nov. 15, 2016

(54) IMAGE DISPLAY APPARATUS AND IMAGE DISPLAY METHOD

(71) Applicant: FUJITSU LIMITED, Kawasaki-shi, Kanagawa (JP)

(72) Inventors: Teruyuki Sato, Tama (JP); Norihiro Kakuko, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 88 days.

(21) Appl. No.: 14/157,590

(22) Filed: Jan. 17, 2014

(65) Prior Publication Data
US 2014/0233100 A1 Aug. 21, 2014

(30) Foreign Application Priority Data
Feb. 20, 2013 (JP) ................ 2013-030791

(51) Int. Cl.
G02B 27/01 (2006.01)
G02B 27/22 (2006.01)

(52) U.S. Cl.
CPC ....... *G02B 27/0172* (2013.01); *G02B 27/2214* (2013.01); *G02B 2027/0134* (2013.01); *G02B 2027/0138* (2013.01); *G02B 2027/0178* (2013.01)

(58) Field of Classification Search
CPC ......... G02B 27/0172; G02B 27/2214; G02B 2027/0134; G02B 2027/0138; G02B 2027/0178
See application file for complete search history.

(56) References Cited

U.S. PATENT DOCUMENTS

2011/0090419 A1* 4/2011 Yokoyama ............ 349/57
2013/0155200 A1* 6/2013 Kakuko et al. .......... 348/49
2013/0258461 A1* 10/2013 Sato et al. ............ 359/464

FOREIGN PATENT DOCUMENTS

| JP | 5-260527 | 10/1993 |
| JP | 7-270722 | 10/1995 |
| JP | 2006-91333 | 4/2006 |
| JP | 2006-287592 | 10/2006 |
| JP | 2011-145488 | 7/2011 |

OTHER PUBLICATIONS

Yoshihiro Kajiki, et al. "Report on the Final Results of the Advanced 3-D Image Telecommunication Project" [online], Telecommunications Advancement Organization of Japan, pp. 144-201, Sep. 9, 1997 [retrieved on Feb. 5, 2013]. Retrieved from the Internet: <URL: http://seika-kokai.nict.go.jp/doc/result/199611005/199611005_houkoku-04.pdf>, with English translation.

(Continued)

*Primary Examiner* — Zachary Wilkes
*Assistant Examiner* — George G King
(74) *Attorney, Agent, or Firm* — Fujitsu Patent Center

(57) ABSTRACT

A display displays a composite image including element pixels. Each element pixel is formed by arranging, in a direction, pixels respectively extracted from images having different viewpoints. A first optical element includes lenses arrayed in the direction to correspond to the element pixels and emits in parallel light rays emitted from pixels respectively included in the element pixels, for a particular image. A second optical element condenses the light rays. An output circuit selects a pixel of the particular image which is included in a particular element pixel and outputs its pixel value to the display. At this time, a pixel more distant from an optical axis of the second optical element along the direction in the particular image is selected as a distance between the first and second optical elements becomes smaller than a focal length of the second optical element.

4 Claims, 29 Drawing Sheets

(56) References Cited

OTHER PUBLICATIONS

Tao, "Report on the Final Results of the Advanced 3-D Image Telecommunication Project" [online], Telecommunications Advancement Organization of Japan, pp. 144-201, Sep. 9, 1997 [retrieved on Feb. 5, 2013]. Retrieved from the Internet: <URL: http://seika-kokai.nict.go.jp/doc/result/199611005/199611005_houkoku-04.pdf>. English translation will follow.

* cited by examiner

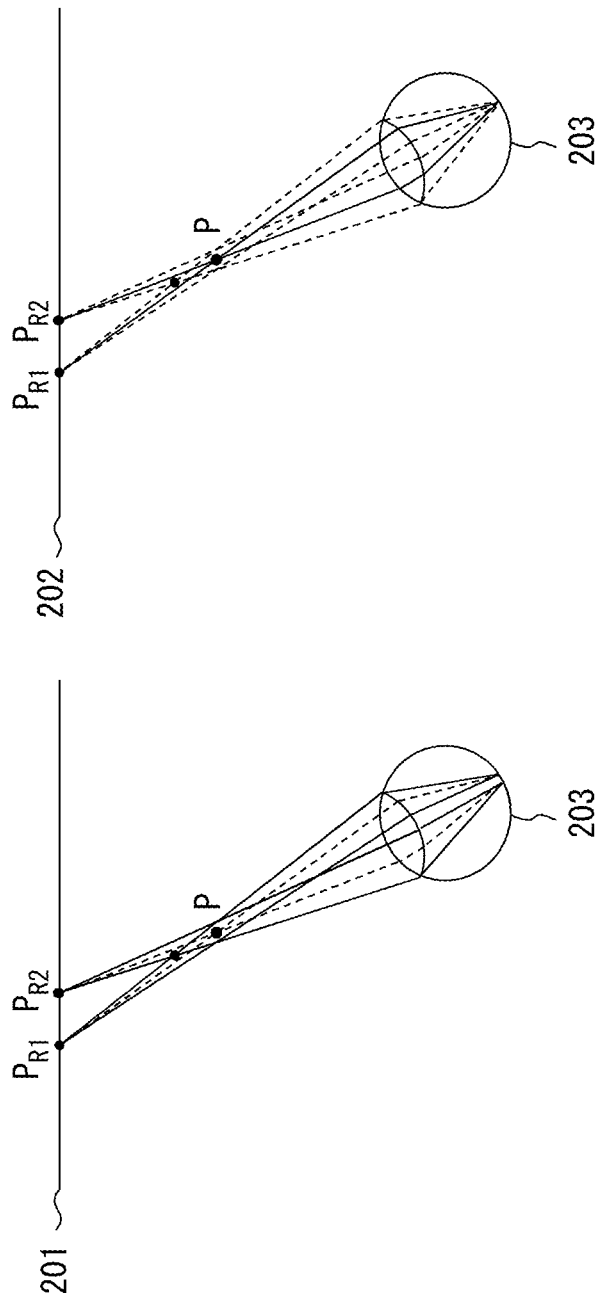

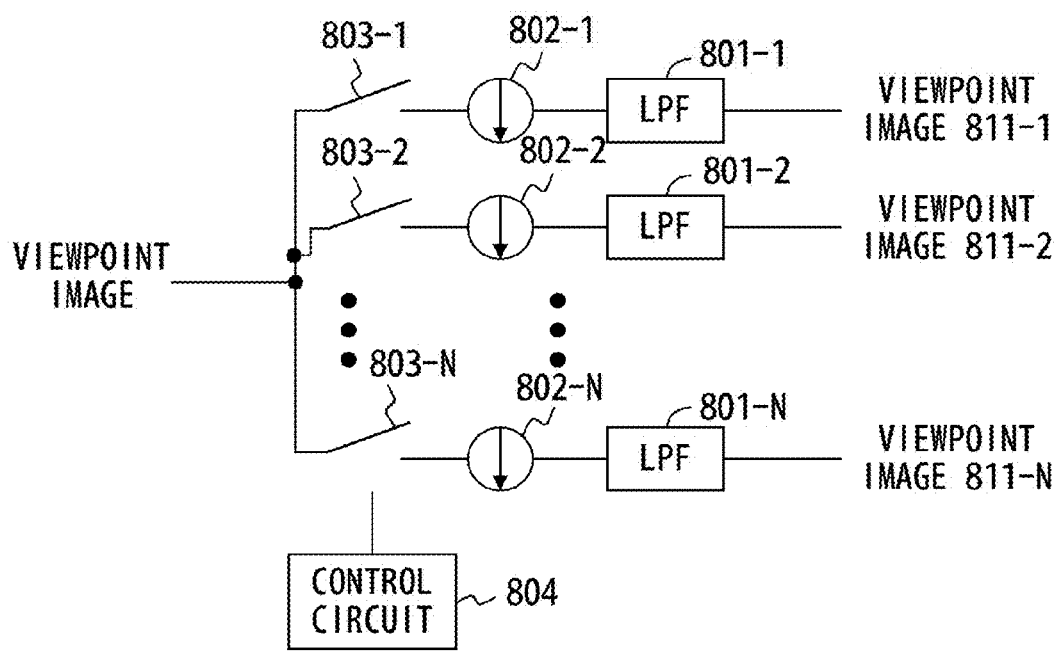
F I G. 8

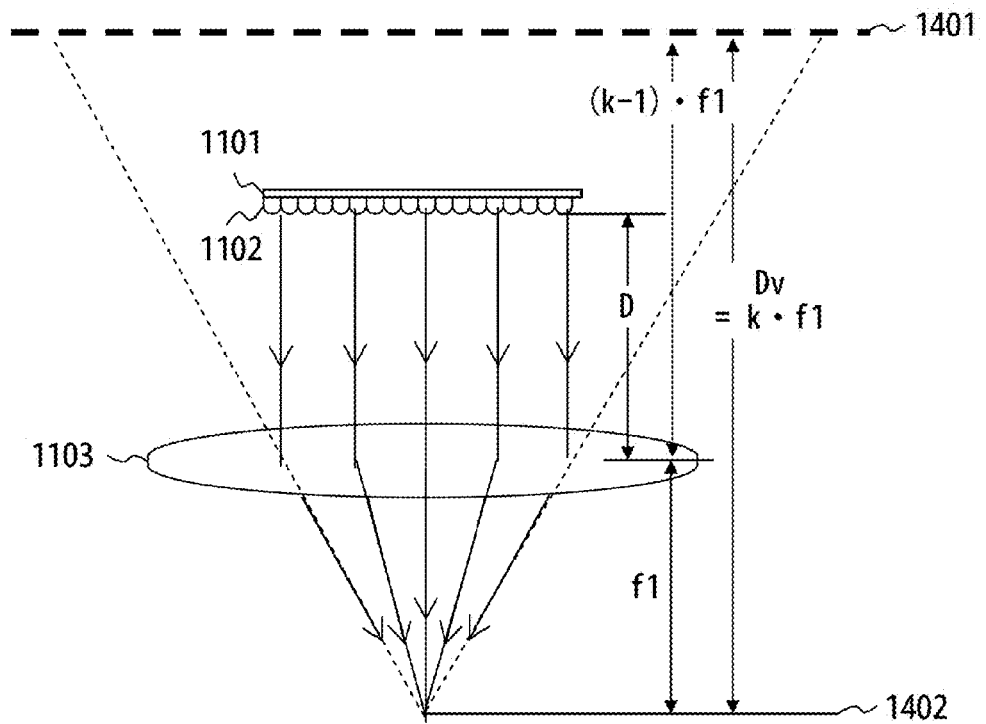
F I G. 14

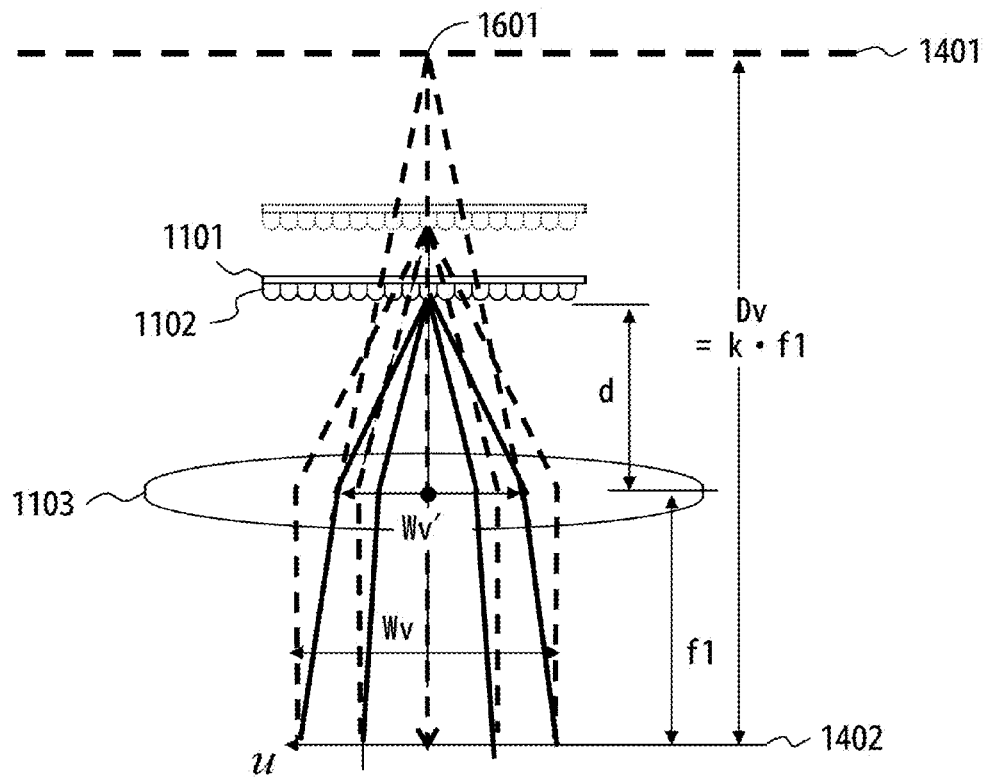
F I G. 21

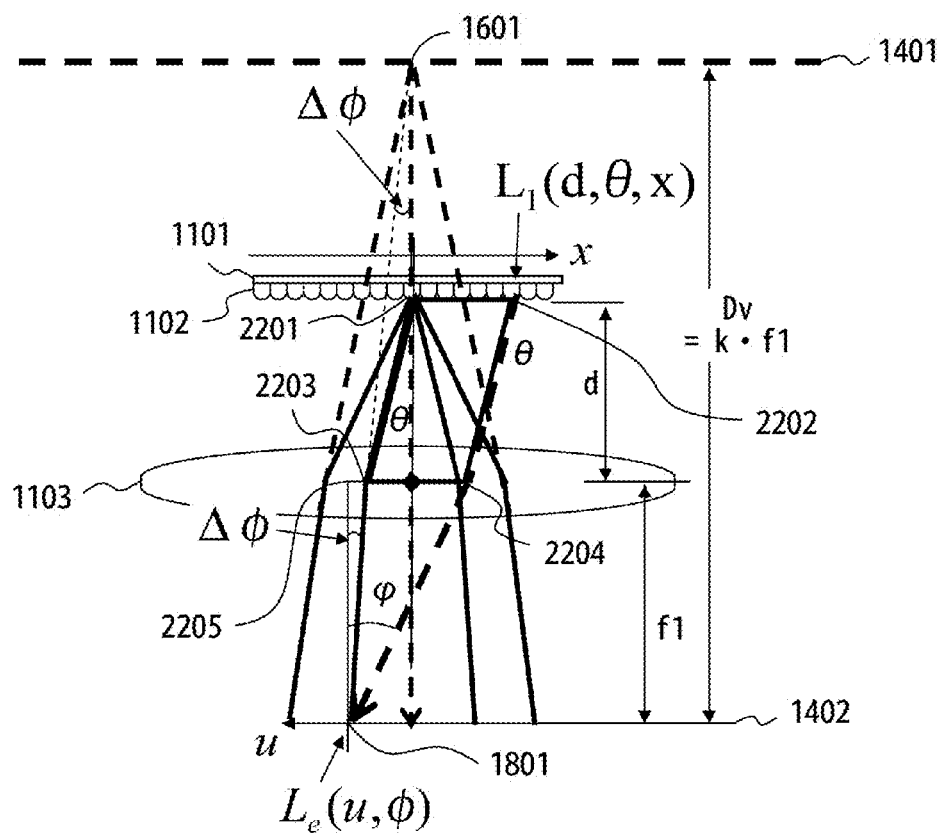
F I G. 22

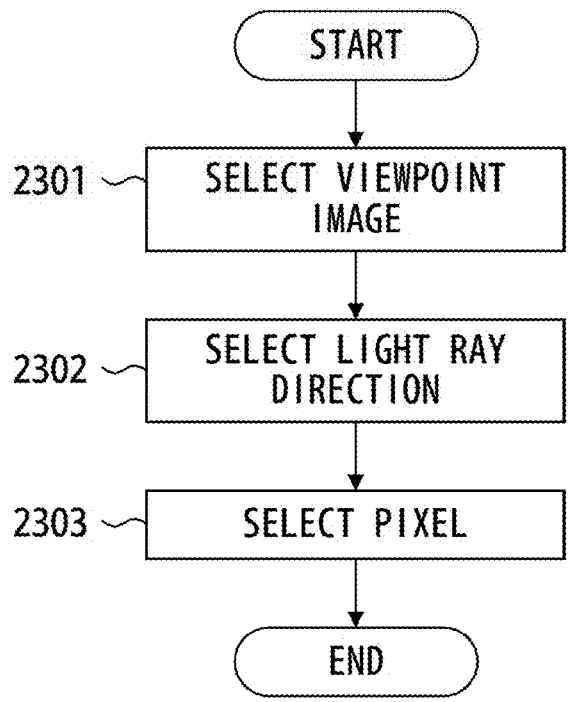
F I G. 23

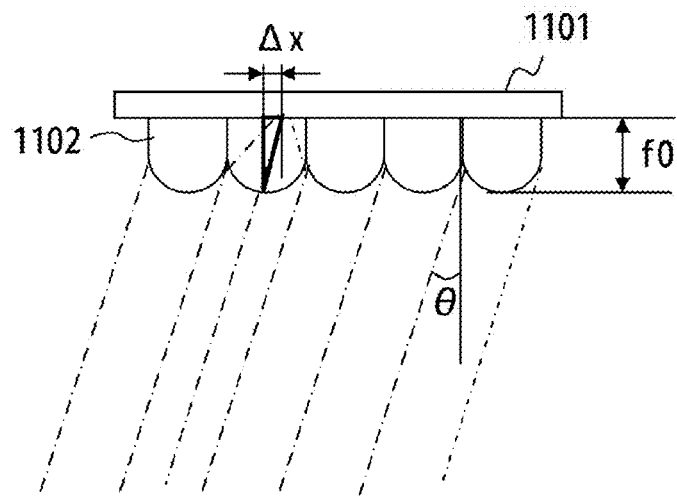
F I G. 25 A
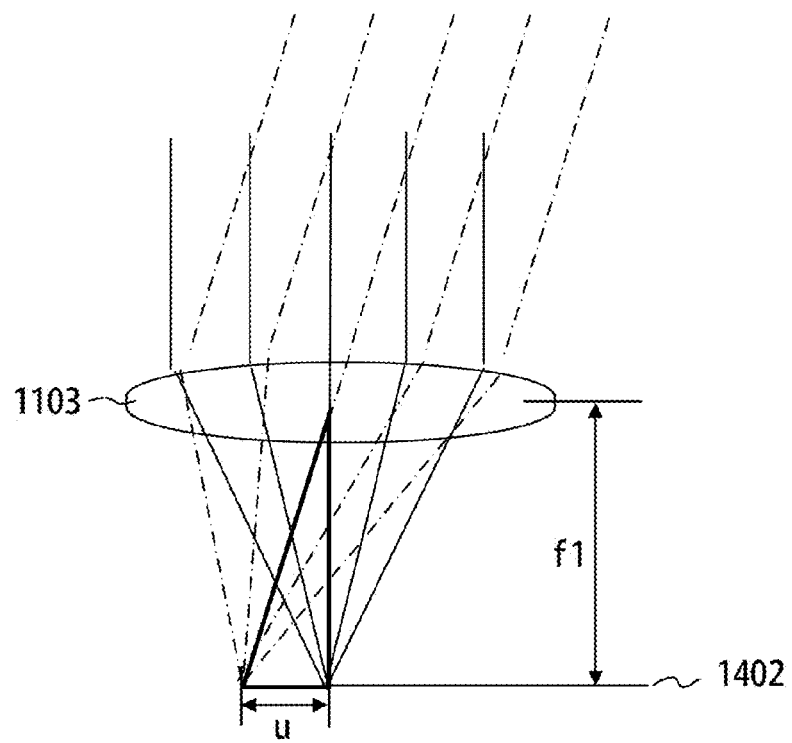
F I G. 25 B

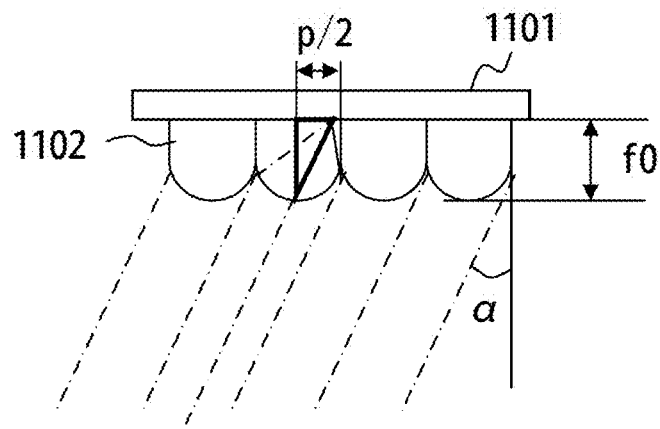
F I G. 26A
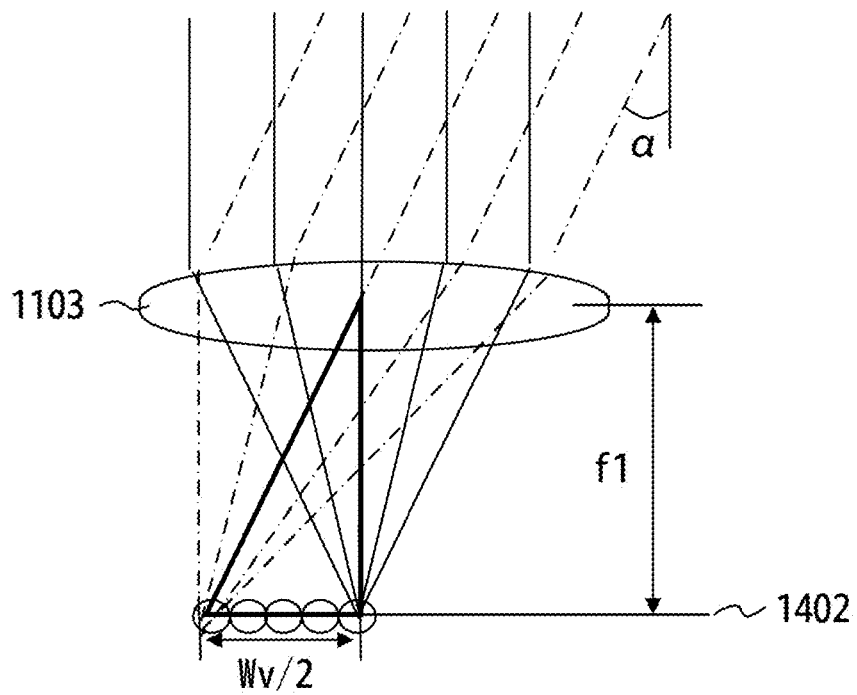
F I G. 26B

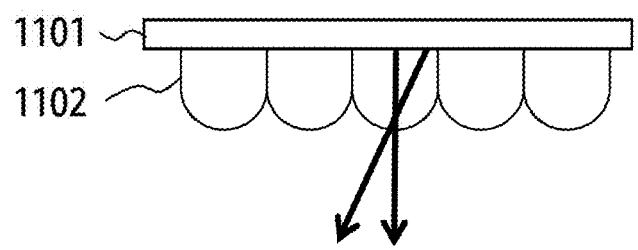
F I G. 27A
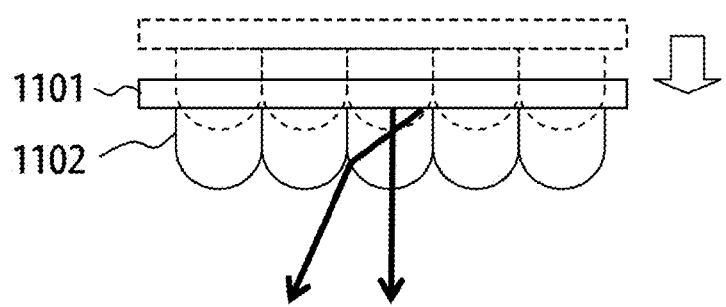
F I G. 27B

IMAGE DISPLAY APPARATUS AND IMAGE DISPLAY METHOD

CROSS-REFERENCE TO RELATED APPLICATION

This application is based upon and claims the benefit of priority of the prior Japanese Patent Application No. 2013-030791, filed on Feb. 20, 2013, the entire contents of which are incorporated herein by reference.

FIELD

The embodiments discussed herein relate to an image display apparatus and an image display method.

BACKGROUND

In wearable computing, a head mount display (HMD) is known as a display apparatus to be mounted on a human body. When an HMD is mounted on a human's head, the human has his/her hands free. Thus, HMDs are expected as operator assistance display apparatuses.

Main components of an HMD are displays which display a moving image or a still image and eyepieces which expand the range of clear vision of the display. An HMD has one pair of combinations of a display and an eyepiece for each left and right eye, and allows left and right eye to view independent images. The HMD functions as a two-dimensional display when the HMD displays a single same image for both left and right eyes, and it functions as a three-dimensional display which allows depth recognition by binocular parallax when the HMD displays separate images with a parallax therebetween as an image for a left eye and an image for a right eye.

However, regardless of whether an HMD is used, a stereoscopic 3D display utilizing binocular parallax is known to be problematic in that an observer is likely to feel unnaturalness and suffers great eyestrain. As solutions to the problem, a multi-view 3D display system and a super multi-view 3D display system are proposed (see, e.g., Non-patent Document 1).

FIG. 1 shows an example of a multi-view 3D display system. A multi-view 3D display system is a technology to express "motion parallax" that refers to a change in view with a turn of a head by generating a plurality of viewpoint images corresponding to observation positions in a space and displaying 3D images closer to nature. A multi-view 3D display apparatus in FIG. 1 includes a display 101 and a three-dimensional filter 102 and has sets of viewpoint images 1 to 4 placed at intervals corresponding to an inter-ocular distance. With this configuration, a visible stereoscopic image changes according to the observation position, and motion parallax is expressed.

FIGS. 2A and 2B show a difference between a multi-view 3D display system and a super multi-view 3D display system. In the nature world, light rays serving as leads for a human to perceive a three-dimensional space are ones having passed through the pupils of left and right eyes of continuous light rays from an actual object. When such continuous light rays are to be sampled to display a 3D image, for example, a configuration with a lenticular lens 201 provided on a surface of a display is adopted, as in the multi-view 3D display system shown in FIG. 2A. In the lenticular lens 201 in the multi-view 3D display system, however, the sampling interval for viewpoint images to be generated is too wide.

For this reason, it is desirable to make a sampling interval $d_s$ for viewpoint images to be generated by a lenticular lens 202 smaller than a pupil diameter $d_p$ of a human, as in the super multi-view 3D display system shown in FIG. 2B. Unnaturalness of a stereoscopic image is reduced by, for example, giving a slight parallax between a viewpoint image $P_{R1}$ and a viewpoint image $P_{R2}$ corresponding to light rays which are emitted from the lenticular lens 202 and entering an eyeball 203 when an object point P is viewed with a right eye.

FIGS. 3A and 3B show an accommodation of an eyeball which is induced by a super multi-view 3D display system. If the eyeball 203 is focused on the lenticular lens 202, as shown in FIG. 3A, when light rays for a viewpoint image $P_{R1}$ and a viewpoint image $P_{R2}$ simultaneously enter the eyeball 203, the two viewpoint images are projected as a double image onto different positions of a retina. In this case, the viewpoint images $P_{R1}$ and $P_{R2}$ are recognized as a blur on the retina.

The cerebral function of avoiding blurred vision then induces an accommodative stimulus to the eyeball 203 such that the two viewpoint images are projected onto one point on the retina. If the eyeball 203 is focused on a position in a space which is perceived from a binocular parallax, as shown in FIG. 3B, a natural stereoscopic image is visually recognized.

Similarly, when an observer views an object in the natural world, the accommodation of the eyeball, trying to be focused on a position in a space of an object which is perceived through binocular convergence, works due to the cerebral function of avoiding blurred vision. If eyeballs are focused on a position in a space which is perceived with a binocular parallax between images by the accommodation of the eyeballs, there is no longer any distinction between a state in which an image is viewed and a state in which an object is viewed in the natural world, which allows visual recognition of a natural 3D image.

A configuration of an HMD switchable between 2D display and 3D display is also known in which left and right image light beams are distributed to different directions by providing a lenticular lens between a display and an eyepiece lens (see, e.g., Patent Document 1).

Patent Document 1: Japanese Laid-Open Patent Publication No. 2011-145488

Non-patent Document 1: "Report on the Final Results of the Advanced 3-D Image Telecommunication Project" [online], Telecommunications Advancement Organization of Japan, pp. 144-201, Sep. 9, 1997 [retrieved on Feb. 5, 2013]. Retrieved from the Internet: <URL: http://seika-kokai.nict.go.jp/doc/result/199611005/19961 1005_houkoku-04.pdf>

SUMMARY

According to an aspect of the embodiment, an image display apparatus includes a display, a first optical element, a second optical element, and an output circuit.

The display displays a composite image including a plurality of element pixels. Each element pixel is formed by arranging, in a direction, a plurality of pixels respectively extracted from a plurality of images having a plurality of viewpoints different from each other.

The first optical element includes a plurality of lenses which are arrayed in the direction to correspond to the plurality of element pixels. The lenses emit in parallel a plurality of light rays emitted from a plurality of pixels respectively included in the plurality of element pixels, for a particular image of the plurality of images. The second optical element condenses the plurality of light rays emitted from the first optical element.

The output circuit selects a pixel of the particular image which is included in a particular element pixel of the plurality of element pixels on the basis of a selection logic. The selection logic is to select a pixel at a position more distant from a position corresponding to an optical axis of the second optical element along the direction in the particular image as an element-to-element distance between the first optical element and the second optical element becomes smaller than a focal length of the second optical element. The output circuit outputs a pixel value of the selected pixel to the display.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A and 3B illustrate an accommodative action of an eyeball which is induced by a super multi-view 3D display system;
FIG. 8 is a configuration diagram of an image selecting circuit;
FIG. 14 illustrates the relationship between a virtual image position and a lens-to-lens distance;
FIG. 21 illustrates a spreading width of light rays when $d<f1$;
FIG. 22 illustrates the trajectory of a light ray when $d<f1$;
FIG. 23 is a flow chart illustrating the operation of the output circuit;
FIG. 25A and FIG. 25B illustrate optical paths of light rays;
FIG. 26A and FIG. 26B illustrate the relationship between the width of an element lens and an observation viewing area;
FIG. 27A and FIG. 27B illustrate an ideal state and an allowable limit, respectively, for light rays for a plurality of viewpoint images.

DESCRIPTION OF EMBODIMENTS

The above-described conventional HMD suffers the problem below.

In an HMD, the positions of two eyes relative to a built-in display do not change. It is thus considered unnecessary to express motion parallax except that there are variations in inter-ocular distance among individuals. If a 3D image is displayed using a super multi-view 3D display system in spite of the lack of the need in an HMD, natural visual recognition of the 3D image can be expected, as described above.

However, a technique is not known to display a correct 3D image on the basis of the layout of a lenticular lens and an eyepiece lens in a case where the lenticular lens is provided between a display and the eyepiece lens in an image display apparatus, such as an HMD, having an optical system in which a virtual image is visually recognized through the eyepiece lens.

Note that the problem is not limited to a case where a lenticular lens is provided between a display and an eyepiece lens of an HMD and also occurs in a different image display apparatus which displays a 3D image through two optical elements.

An embodiment will be described in detail below with reference to the drawings.

Figure 1:
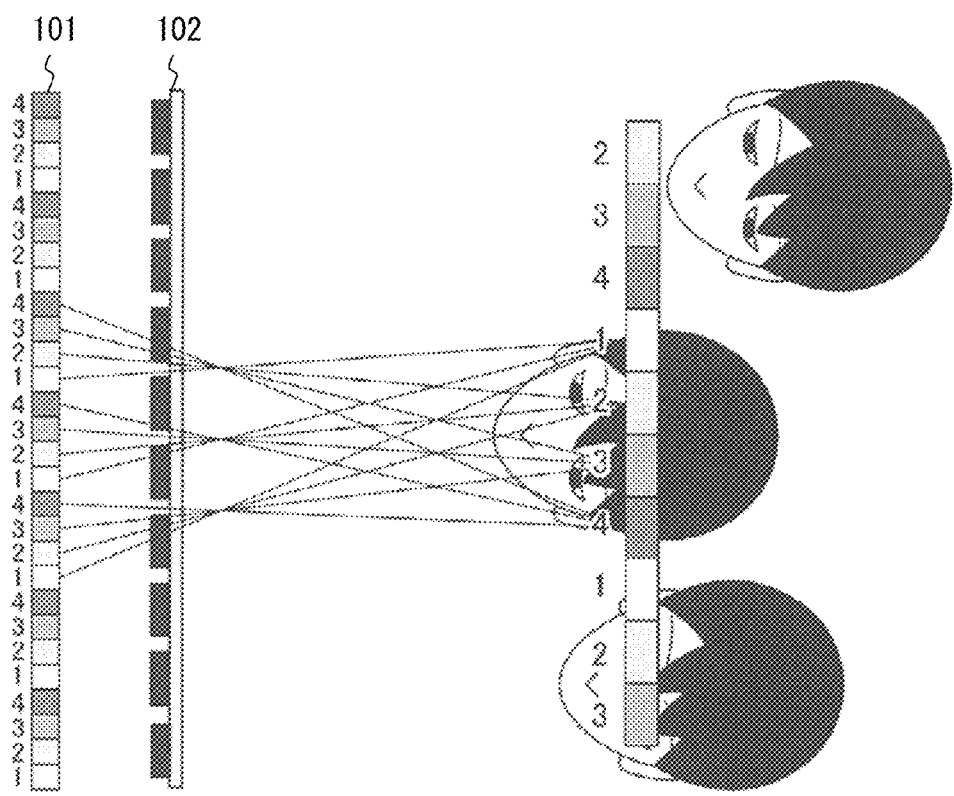
FIG. 1 illustrates a multi-view 3D display system.
Figure 2B:
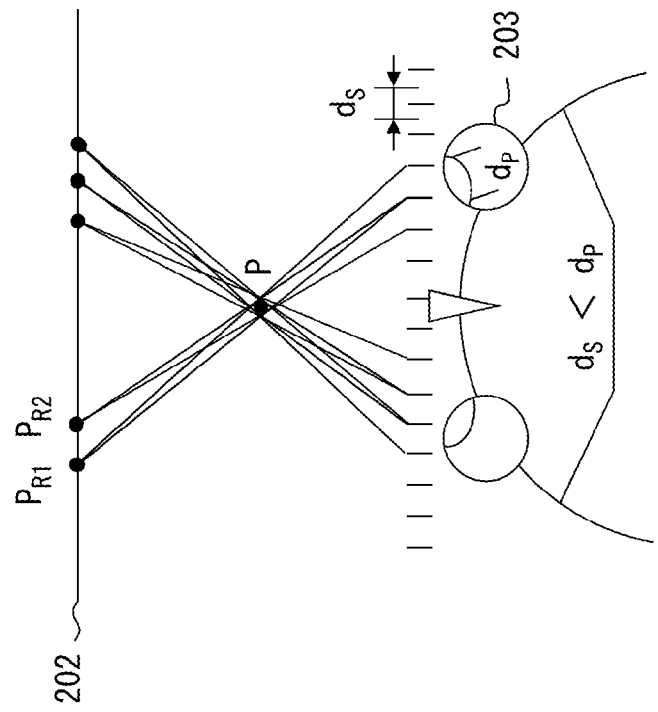
FIGS. 2A and 2B illustrate a difference between a multi-view 3D display system and a super multi-view 3D display system.
Figure 2A:
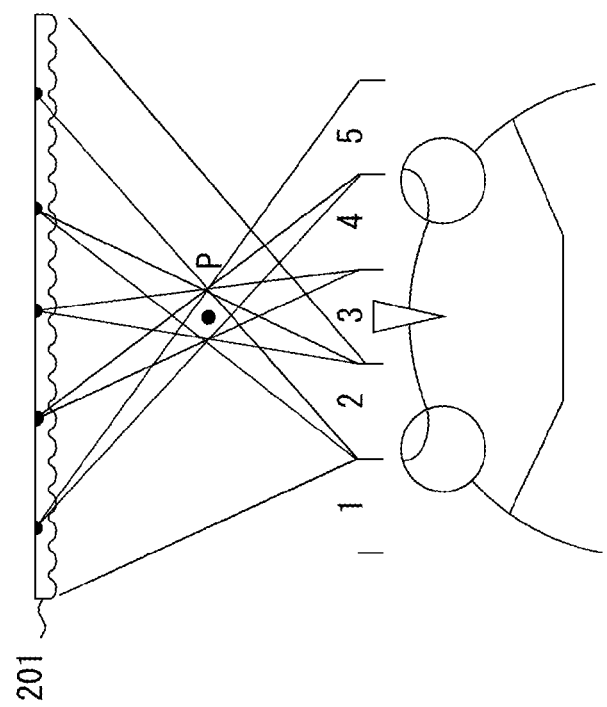
Figure 4:
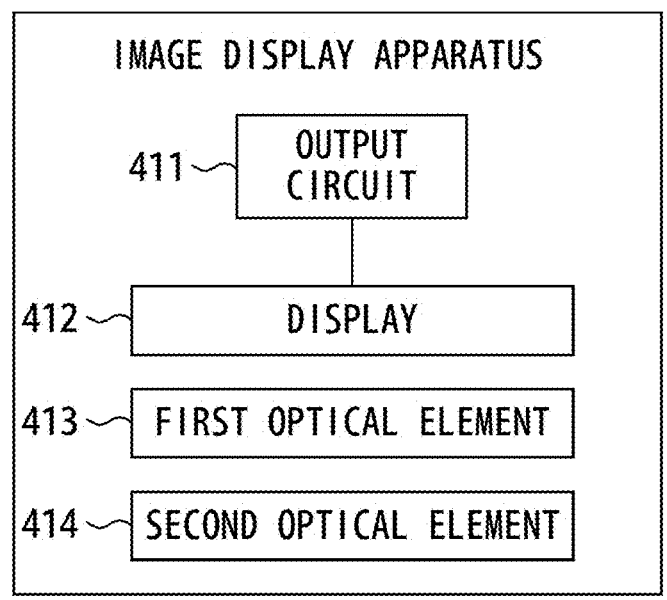
FIG. 4 is a configuration diagram of an image display apparatus.

FIG. 4 illustrates an example of the configuration of an image display apparatus according to the embodiment. An image display apparatus 401 in FIG. 4 includes an output circuit 411, a display 412, a first optical element 413, and a second optical element 414.

The display 412 displays a composite image including a plurality of element pixels. Each element pixel is formed by arranging, in a direction, a plurality of pixels respectively extracted from a plurality of images having a plurality of viewpoints different from each other.

The first optical element 413 includes a plurality of lenses which are arrayed in the direction to correspond to the plurality of element pixels. The lenses emit in parallel a plurality of light rays emitted from a plurality of pixels respectively included in the plurality of element pixels, for a particular image of the plurality of images. The second optical element 414 condenses the plurality of light rays emitted from the first optical element 413.

The output circuit 411 selects a pixel of the particular image which is included in a particular element pixel of the plurality of element pixels on the basis of a selection logic. A feature of the selection logic is that the selection logic changes according to two optical system requirements, an element-to-element distance between the first optical element 413 and the second optical element 414 and the focal length of the second optical element 414, after the optical system requirements are defined. That is, the selection logic is to select a pixel at a position more distant from a position corresponding to an optical axis of the second optical element 414 along the direction in the particular image as the element-to-element distance between the first optical element 413 and the second optical element 414 becomes smaller than the focal length of the second optical element 414. The output circuit 411 outputs the pixel value of the selected pixel to the display 412.

According to this image display apparatus, a correct 3D image can be displayed through the first optical element 413 and the second optical element 414.

Figure 5:
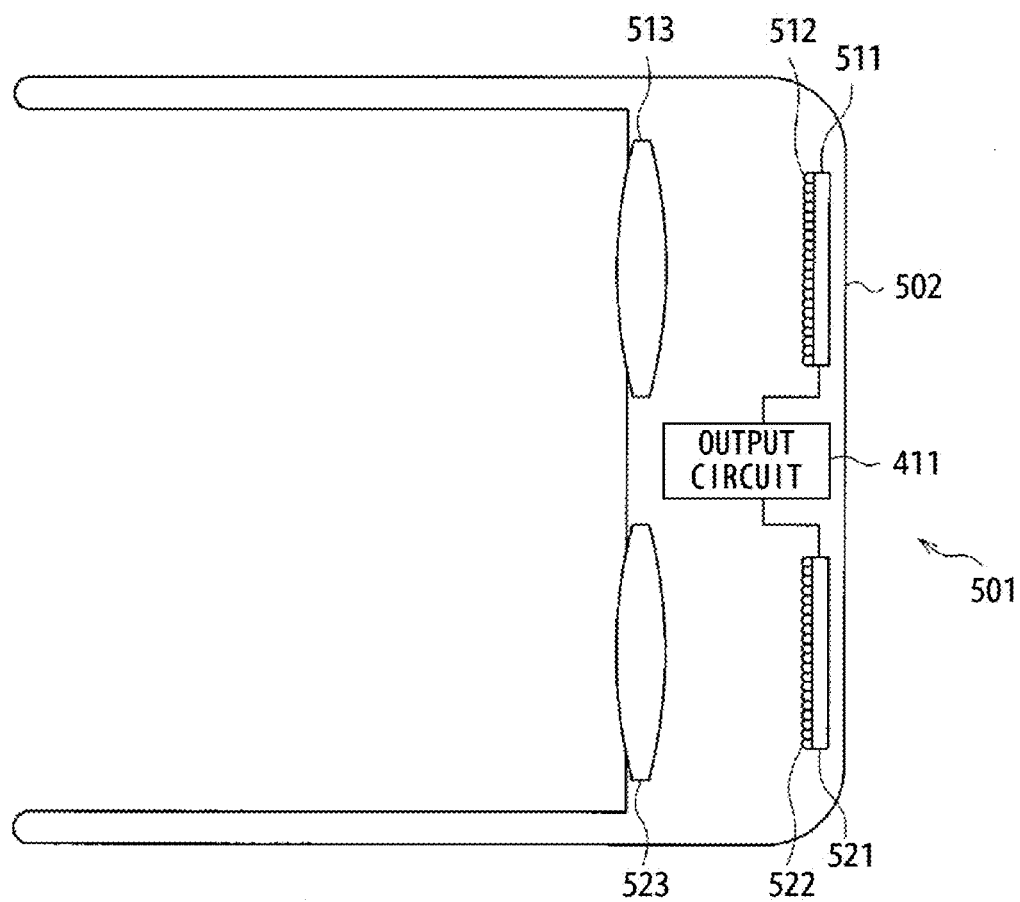
FIG. 5 is a configuration diagram of an HMD.

FIG. 5 illustrates an example of the configuration of an HMD which is one example of the image display apparatus 401 in FIG. 4. An HMD 501 in FIG. 5 is an image display apparatus capable of displaying 3D image utilizing a super multi-view 3D display system.

The HMD 501 includes an enclosure 502, the output circuit 411, a display 511, a lenticular lens 512, an eyepiece lens 513, a display 521, a lenticular lens 522, and an eyepiece lens 523. Of the components, the display 511, the lenticular lens 512, and the eyepiece lens 513 form an optical system for a left eye, and the display 521, the lenticular lens 522, and the eyepiece lens 523 form an optical system for a right eye.

The displays 511 and 521 correspond to the display 412 in FIG. 4; the lenticular lenses 512 and 522, the first optical element 413; and the eyepiece lenses 513 and 523, the second optical element 414.

The lenticular lenses 512 and 522 are bonded to respective display surfaces of the displays 511 and 521. The eyepiece lenses 513 and 523 are spaced apart from the lenticular lenses 512 and 522, respectively.

For example, a liquid crystal display, an organic electroluminescence display, or the like can be used as each of the displays 511 and 521. The eyepiece lenses 513 and 523 are intended to virtually lengthen the short distances to the displays 511 and 521 by causing an observer to observe a virtual image.

The lenticular lenses 512 and 522 are each an optical element having a plurality of elongated element lenses arranged in a width direction of an element lens. Each element lens has a generally semicircular shape in cross-section and has a width corresponding to N pixels arranged in the width direction of the element lens within the display surface of the display 511 (or the display 521). The number N here is the number of viewpoints for a stereoscopic image and is an integer not less than 2.

In the optical system for a left eye, the eyepiece lens 513 is placed closer to a left eye than the lenticular lens 512. In the optical system for a right eye, the eyepiece lens 523 is placed closer to a right eye than the lenticular lens 522. The plurality of element lenses of the lenticular lenses 512 and 522 are arrayed in a lateral direction of the HMD 501.

Note that any other optical element, such as a fly-eye lens, may be used instead of each of the lenticular lenses 512 and 522. Any other optical elements that condense a plurality of light rays at the positions of two eyes of an observer may be used instead of the eyepiece lenses 513 and 523.

Figure 6:
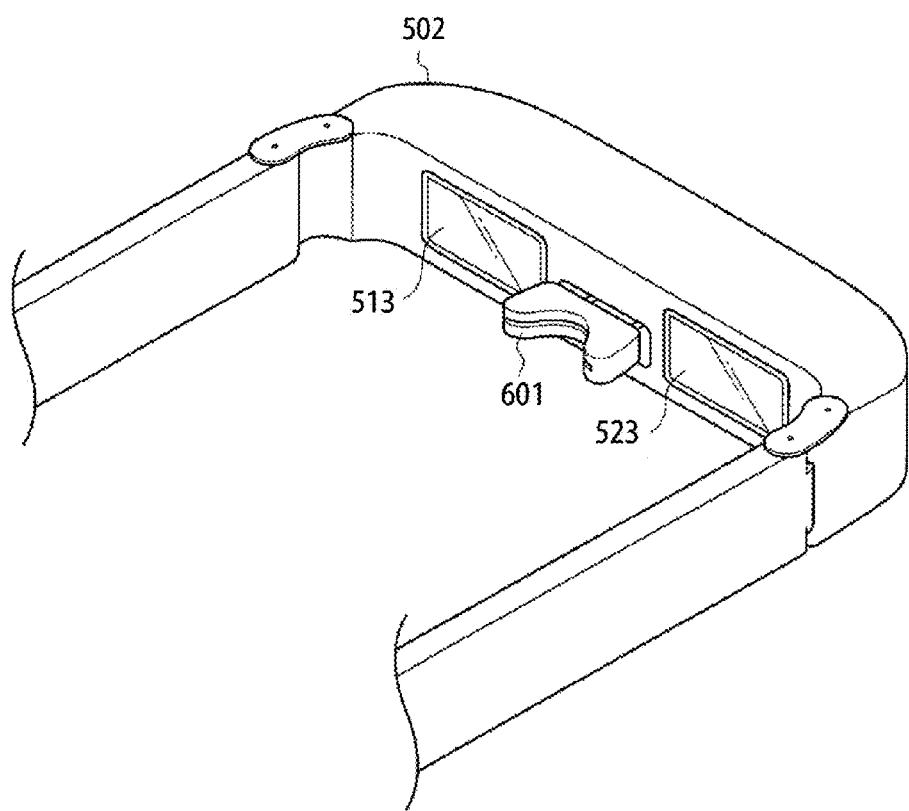
FIG. 6 illustrates the outer appearance of the HMD.

FIG. 6 illustrates the outer appearance of the HMD 501. A nose pad 601 which contacts a nose of an observer when the HMD 501 is mounted on a head of the observer is attached to the enclosure 502 of the HMD 501. As illustrated in FIG. 5, the output circuit 411 is placed between the optical system for a left eye and the optical system for a right eye inside the enclosure 502, and the displays 511 and 521 are connected to the output circuit 411.

The nose pad 601 is provided to make an observation distance from the eyepiece lenses 513 and 523 to two eyes of the observer almost coincide with a focal length f1 of the eyepiece lenses 513 and 523. A different member, such as a pad which is provided in an annular shape around the eyepiece lens 513 (or the eyepiece lens 523) on an outer surface of the enclosure 502 and contacts a skin around an eye when the observer wears the HMD 501, may be used instead of the nose pad 601.

Figure 7:
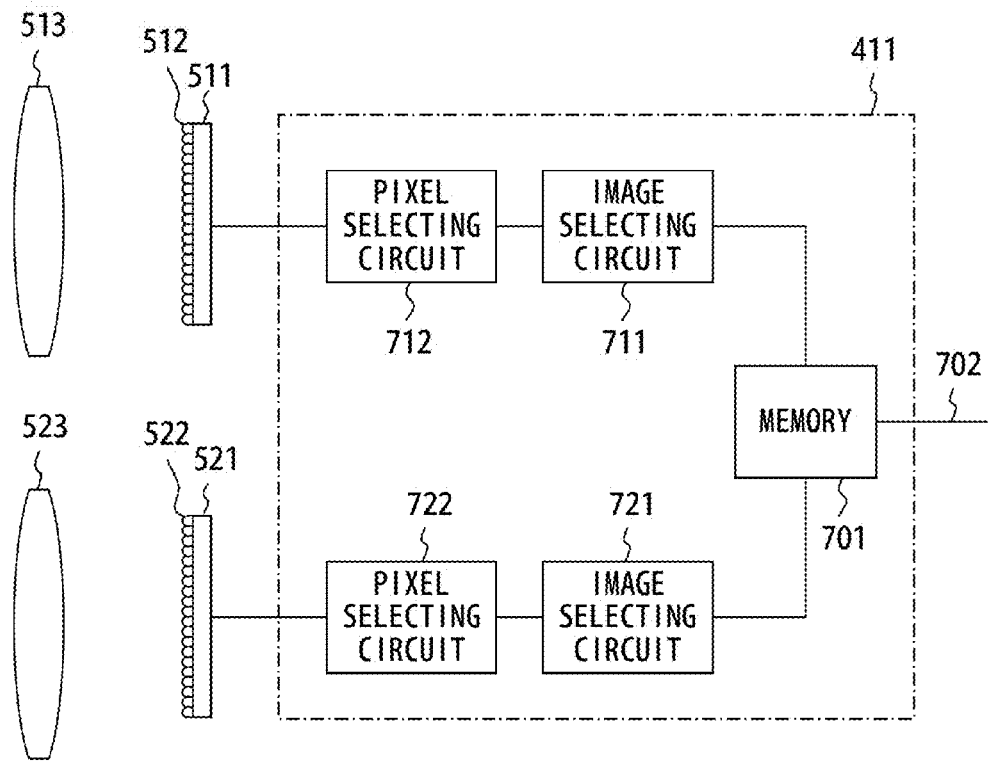
FIG. 7 is a configuration diagram of an output circuit.

FIG. 7 illustrates an example of the configuration of the output circuit 411 in FIG. 5. The output circuit 411 in FIG. 7 includes a memory 701, an image selecting circuit 711, a pixel selecting circuit 712, an image selecting circuit 721, and a pixel selecting circuit 722. Of the components, the memory 701 is, for example, a frame memory, and the image selecting circuit 711, the pixel selecting circuit 712, the image selecting circuit 721, and the pixel selecting circuit 722 can be implemented as, e.g., integrated circuits. As each integrated circuit, a programmable integrated circuit, such as a field-programmable gate array, may be used.

Pieces of moving image data for left and right eyes are inputted from, e.g., a moving image reproduction apparatus to the memory 701 via an interface 702, and the memory 701 stores the input pieces of moving image data. Each piece of moving image data includes N pieces of moving image data having viewpoint positions different from each other along the lateral direction. Each of the N pieces of moving image data includes a plurality of frames in chronological order.

The image selecting circuit 711 reads out the N pieces of moving image data for a left eye from the memory 701, selects one of N viewpoint images included in respective frames of the read-out pieces of moving image data, and outputs the one viewpoint image to the pixel selecting circuit 712. The image selecting circuit 721 reads out the N pieces of moving image data for a right eye from the memory 701, selects one of N viewpoint images included in respective frames of the read-out pieces of moving image data, and outputs the one viewpoint image to the pixel selecting circuit 722.

The pixel selecting circuit 712 selects a pixel corresponding to each pixel of the display 511 from among a plurality of pixels included in the viewpoint image output from the image selecting circuit 711 and outputs the pixel value of the pixel to the display 511. The pixel selecting circuit 722 selects a pixel corresponding to each pixel of the display 521 from among a plurality of pixels included in the viewpoint image output from the image selecting circuit 721 and outputs the pixel value of the pixel to the display 521.

FIG. 8 illustrates an example of the configuration of each of the image selecting circuits 711 and 721 in FIG. 7. The image selecting circuit in FIG. 8 includes low-pass filters (LPFs) 801-1 to 801-N, downsampling circuits 802-1 to 802-N, switching circuits 803-1 to 803-N, and a control circuit 804.

An LPF 801-$i$ ($i$=1 to N) removes a high-frequency component from a viewpoint image 811-$i$ included in each frame of an i-th piece of moving image data readout from the memory 701. A downsampling circuit 802-$i$ reduces the resolution of the viewpoint image output from the LPF 801-$i$ to 1/N by thinning pixels of the viewpoint image to 1/N in a lateral direction of the viewpoint image. A switching circuit 803-$i$ outputs the viewpoint image output from the downsampling circuit 802-$i$ to the pixel selecting circuit on the basis of a control signal from the control circuit 804.

The control circuit 804 performs control that selects one viewpoint image by outputting a control signal which turns on any one of the switching circuits 803-1 to 803-N and turns off the other switching circuits.

Figure 9:
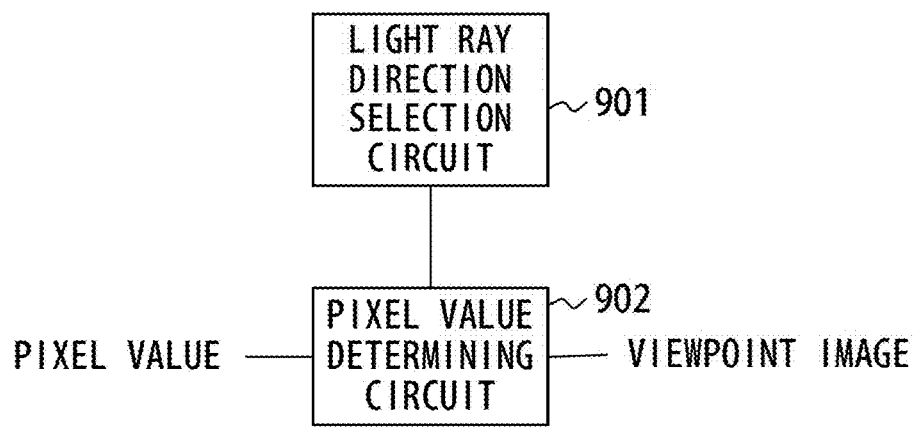
FIG. 9 is a configuration diagram of a pixel selecting circuit.

FIG. 9 illustrates an example of the configuration of each of the pixel selecting circuits 712 and 722. The pixel selecting circuit in FIG. 9 includes a light ray direction selection circuit 901 and a pixel value determining circuit 902.

The light ray direction selection circuit 901 in the pixel selecting circuit 712 selects a light ray direction when a light ray emitted from each pixel of the display 511 passes through the lenticular lens 512 and the eyepiece lens 513 and strikes a viewpoint position and outputs the information of the selected light ray direction to the pixel value determining circuit 902. The pixel value determining circuit 902 selects, from a viewpoint image output from the image selecting circuit 711, a pixel corresponding to the light ray direction output from the light ray direction selection circuit 901 and outputs the pixel value of the pixel to the display 511.

The same applies to the operation of the light ray direction selection circuit 901 and the pixel value determining circuit 902 in the pixel selecting circuit 722.

With the image selecting circuit 711 and the pixel selecting circuit 712, one element pixel can be formed by extracting one pixel from each of corresponding N viewpoint images of N pieces of moving image data for a left eye, arranges the extracted N pixels on the display surface of the display 511 in a lateral direction. By performing this process for all pixels of the N viewpoint images, a composite image for one frame including a plurality of element pixels is generated.

The plurality of element pixels are each a set of N pixels and are formed in regions corresponding to the element lenses of the lenticular lens 512 on the display surface of the display 511. The order in which N pixels are arrayed in each element pixel is reverse to the order of the viewpoint positions along a lateral direction of the viewpoint images from which the N pixels have been extracted.

With the image selecting circuit 721 and the pixel selecting circuit 722, one element pixel can be formed by extracting one pixel from each of corresponding N viewpoint images of N pieces of moving image data for a right eye, arranges the extracted N pixels on the display surface of the display 521 in a lateral direction. By performing this process for all pixels of the N viewpoint images, a composite image for one frame including a plurality of element pixels is generated.

In the HMD 501 in FIG. 5, the lenticular lenses 512 and 522 are bonded to the display surfaces, respectively, of the displays 511 and 521 with the aim of realizing a super multi-view 3D display system. With this configuration, the directions of light rays emitted from N pixels included in a single element pixel corresponding to each element lens of each lenticular lens are different from one another. A light ray from a pixel located at the center of each element lens is emitted straight, and a light ray from a pixel at a position deviated from the center of the element lens is emitted at an angle corresponding to a deviation from the center of the element lens.

Figure 10:
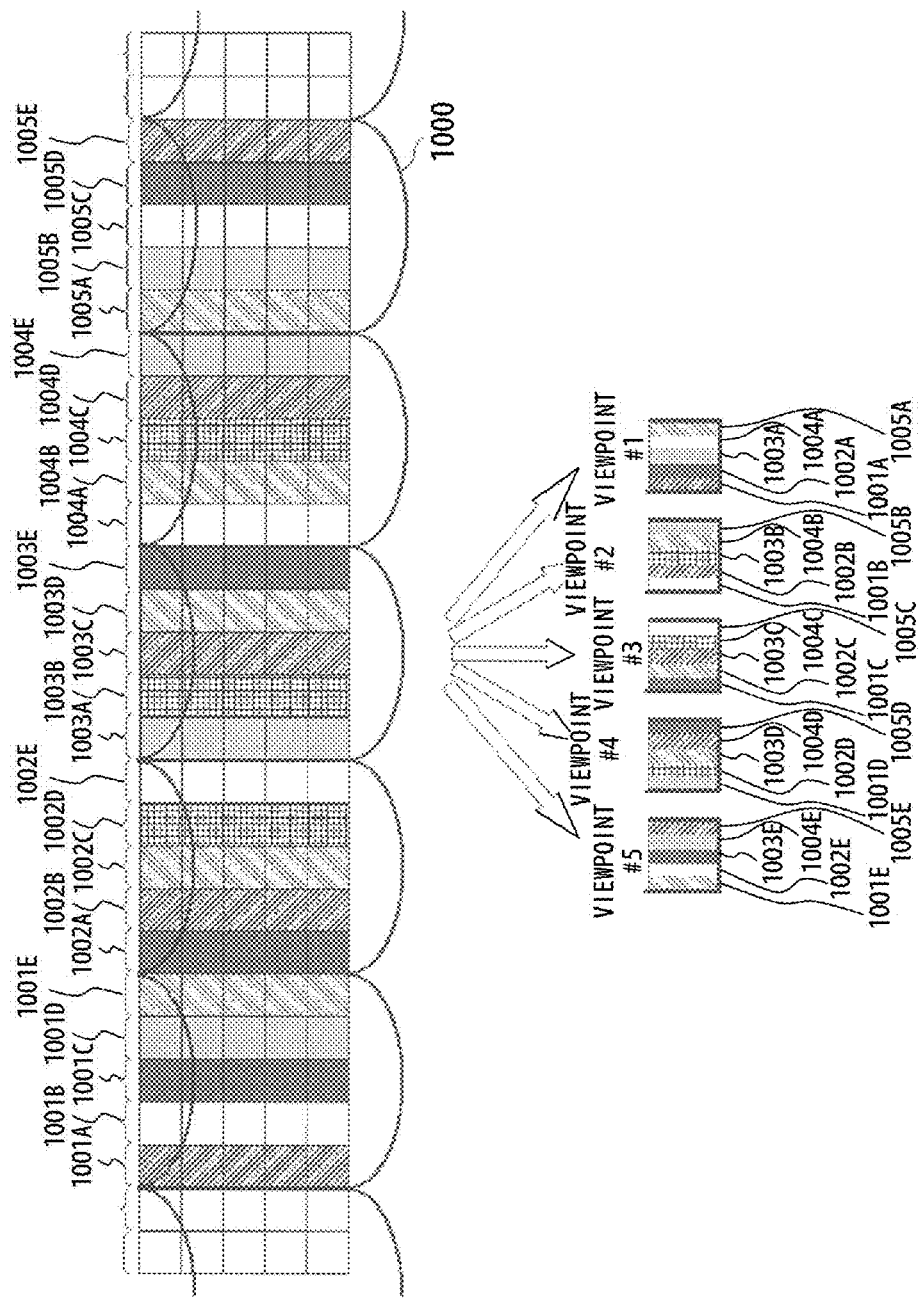
FIG. 10 illustrates the correspondence between a lenticular lens and viewpoint images.

FIG. 10 illustrates an example of the correspondence between a lenticular lens and N viewpoint images when N=5. A lenticular lens 1000 in FIG. 10 corresponds to the lenticular lens 512 or the lenticular lens 522 in FIG. 5, and each element lens of the lenticular lens 1000 includes five pixel columns which are extracted from five viewpoint images.

A viewpoint when a display with the bonded lenticular lens 1000 is observed right in front of the display is viewpoint #3 that is located at the center of viewpoints #1 to #5. A viewpoint image formed at viewpoint #3 includes pixel columns 1001C, 1002C, 1003C, 1004C, and 1005C which are located at the center of the element lenses, respectively, of the lenticular lens 1000.

A viewpoint image formed at viewpoint #4 on the immediate left of viewpoint #3 includes pixel columns 1001D, 1002D, 1003D, 1004D, and 1005D which are located on the immediate right of the pixel column at the center of the element lenses, respectively, of the lenticular lens 1000.

A viewpoint image formed at viewpoint #5 at the left end includes pixel columns 1001E, 1002E, 1003E, 1004E, and 1005E which are located at the right end of the element lenses, respectively, of the lenticular lens 1000.

A viewpoint image formed at viewpoint #2 on the immediate right of viewpoint #3 includes pixel columns 1001B, 1002B, 1003B, 1004B, and 1005B which are located on the immediate left of the pixel column at the center of the element lenses, respectively, of the lenticular lens 1000.

A viewpoint image formed at viewpoint #1 at the right end includes pixel columns 1001A, 1002A, 1003A, 1004A, and 1005A which are located at the left end of the element lenses, respectively, of the lenticular lens 1000.

When a viewpoint position changes, as described above, a direction in which a composite image is observed changes, which changes a viewpoint image to be observed. A direction in which a light ray is emitted, i.e., a viewpoint changes according to the position of each of the N pixels corresponding to each element lens. One pixel in each viewpoint image corresponds to one element lens of the lenticular lens 1000, pixels at the same position in the viewpoint images are formed from light rays emitted by pixels corresponding to a single element lens of the lenticular lens 1000. For example, the pixel columns 1003A to 1003E located at the center of the viewpoint images, respectively, at viewpoints #1 to #5 in FIG. 10 are pixel columns corresponding to the element lens at the center of the lenticular lens 1000.

Figure 11:
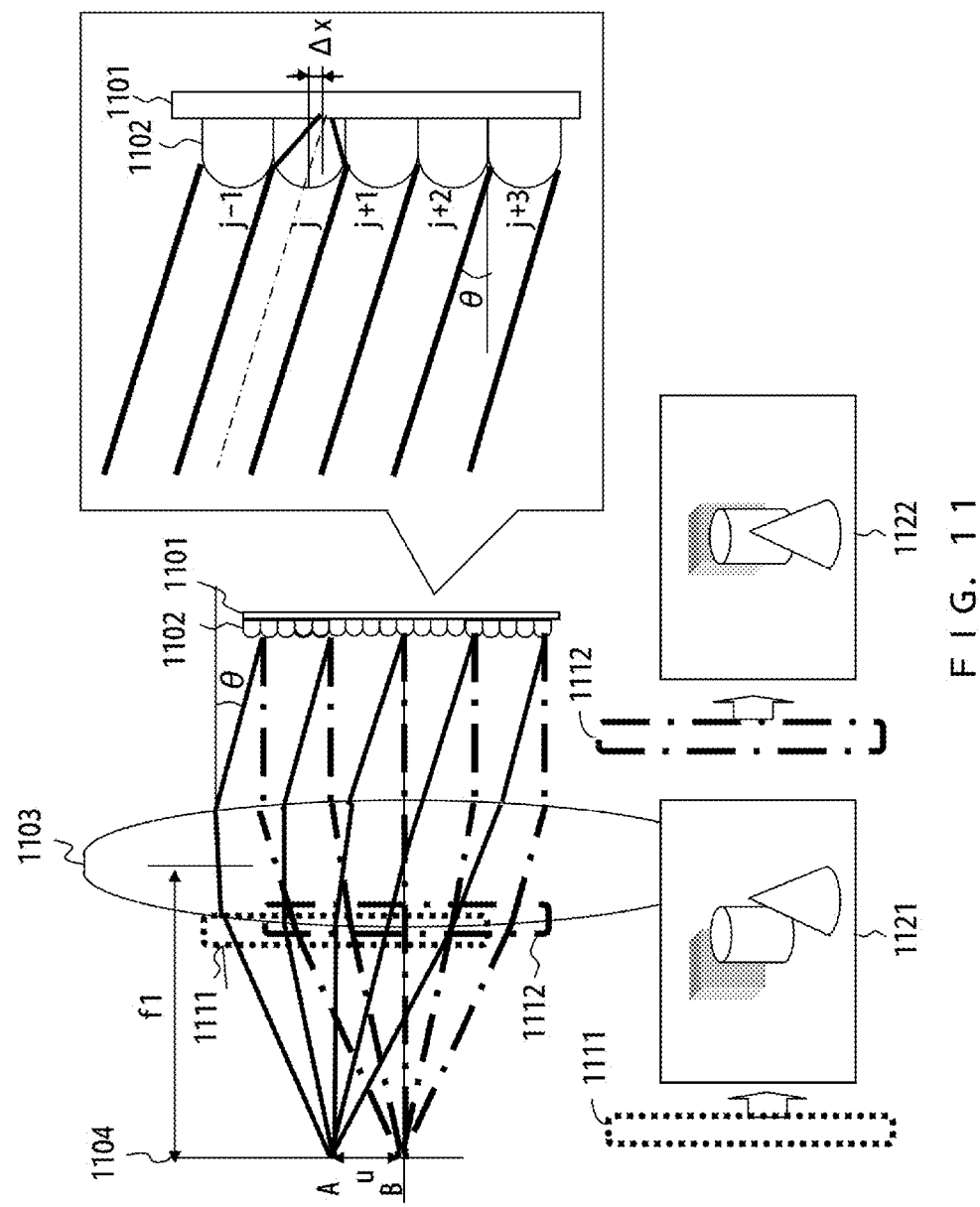
FIG. 11 illustrates the relationship between the amount of deviation from the center of an element lens and the amount of displacement of condensing position.

A change in viewpoint image to be observed through an eyepiece lens will be described with reference to FIGS. 11 and 12. FIG. 11 illustrates the relationship between an amount Δx of deviation from the center of an element lens of a lenticular lens and an amount u of displacement of the condensing position of an eyepiece lens.

A display 1101 in FIG. 11 corresponds to the display 511 or the display 521 in FIG. 5, a lenticular lens 1102 corresponds to the lenticular lens 512 or the lenticular lens 522, and an eyepiece lens 1103 corresponds to the eyepiece lens 513 or the eyepiece lens 523.

Parallel light beams are emitted from the lenticular lens 1102 in a direction of an emission angle θ corresponding to an amount Δx of deviation from the center of each element lens. Assume here that the focal position of the lenticular lens 1102 coincides with a display surface of the display 1101.

The eyepiece lens 1103 condenses the parallel light beams from the lenticular lens 1102 at a position, displaced by an amount u of displacement from an optical axis according to an incident angle θ, on an observation position 1104 which is separated by a focal length f1 of the eyepiece lens 1103. This allows an observer to observe a virtual image of a viewpoint image through the eyepiece lens 1103.

For example, a range surrounded by a broken line 1111 corresponds to a viewpoint image 1121 which is observed at a viewpoint A, and a range surrounded by an alternate long and short dash line 1112 corresponds to a viewpoint image 1122 which is observed at a viewpoint B at the center. As described above, deviation of the position of an eye changes a viewpoint image to be observed. In this case, a j-th (j=1 to M) element lens of M (M is an integer not less than 2)

element lenses of the lenticular lens 1102 on the display surface of the display 1101 corresponds to a j-th pixel constituting a viewpoint image. The amount Δx of deviation in each element lens corresponds to the emission angle θ of parallel light beams and a viewpoint position.

Figure 12:
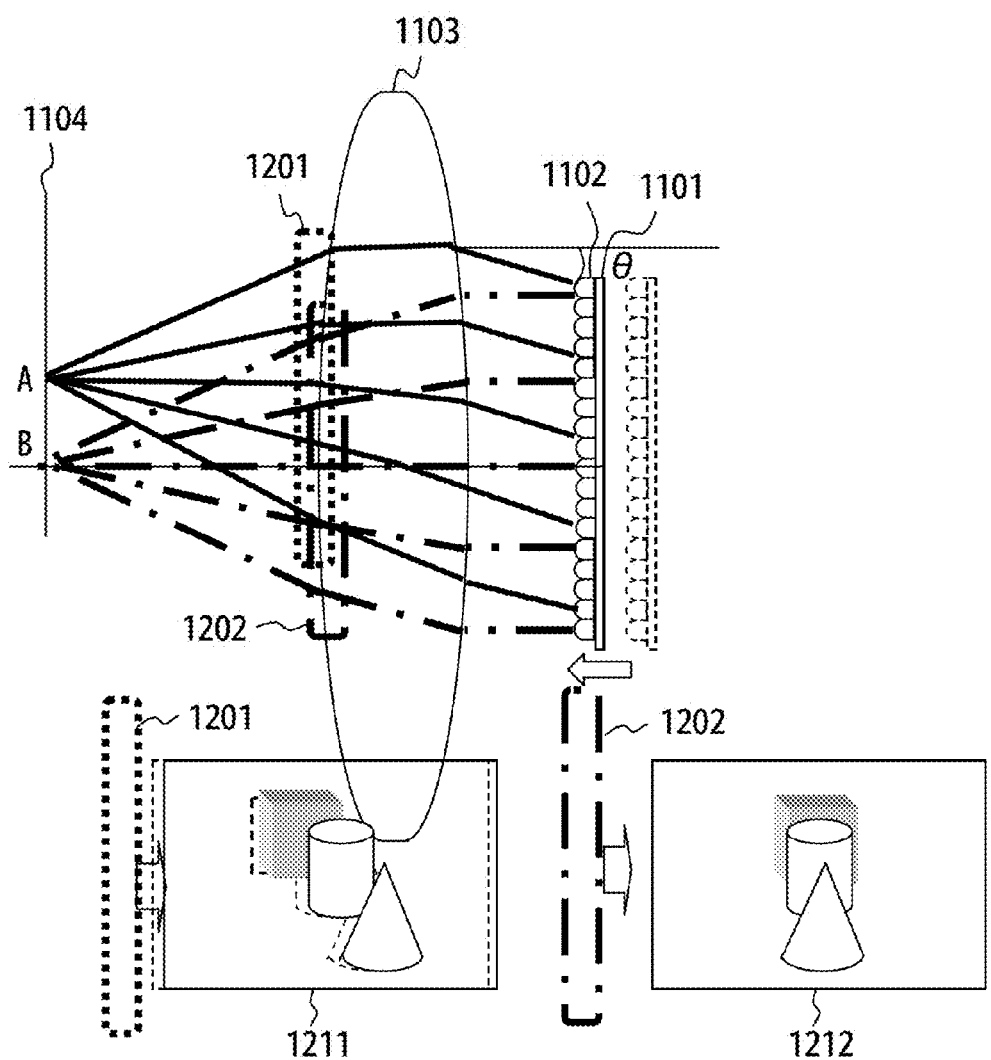
FIG. 12 illustrates a case where a lenticular lens is brought closer to an eyepiece lens.

FIG. 12 illustrates a case where the lenticular lens 1102 in FIG. 11 is brought closer to the eyepiece lens 1103. In this case, a range surrounded by a broken line 1201 corresponds to a viewpoint image 1211 which is observed at the viewpoint A, and a range surrounded by an alternate long and short dash line 1202 corresponds to a viewpoint image 1212 which is observed at the viewpoint B at the center.

The viewpoint image observed at each viewpoint is an image which is formed from pixels corresponding to element lenses at positions where the trajectories of light rays from the viewpoint reach the lenticular lens 1102. As compared with the trajectories of light rays from the viewpoint A in FIG. 11, the trajectories of light rays from the viewpoint A in FIG. 12 reach the element lenses on the immediate left of one instead of the same element lenses of the lenticular lens 1102.

Accordingly, the viewpoint image 1211 that is formed from pixels corresponding to element lenses on the immediate left is observed at the viewpoint A in FIG. 12. As indicated by the broken line, the viewpoint image 1211 is an image shifted to the right, and a parallax between the viewpoint image 1211 and the viewpoint image 1212 is inappropriate.

An image display method which can generate a composite image suited to an optical system layout even if the lenticular lens 1102 is brought closer to the eyepiece lens 1103 will be considered with reference to FIGS. 13 to 22. A composite image will also be referred to as a multi-viewpoint image hereinafter.

Figure 13:
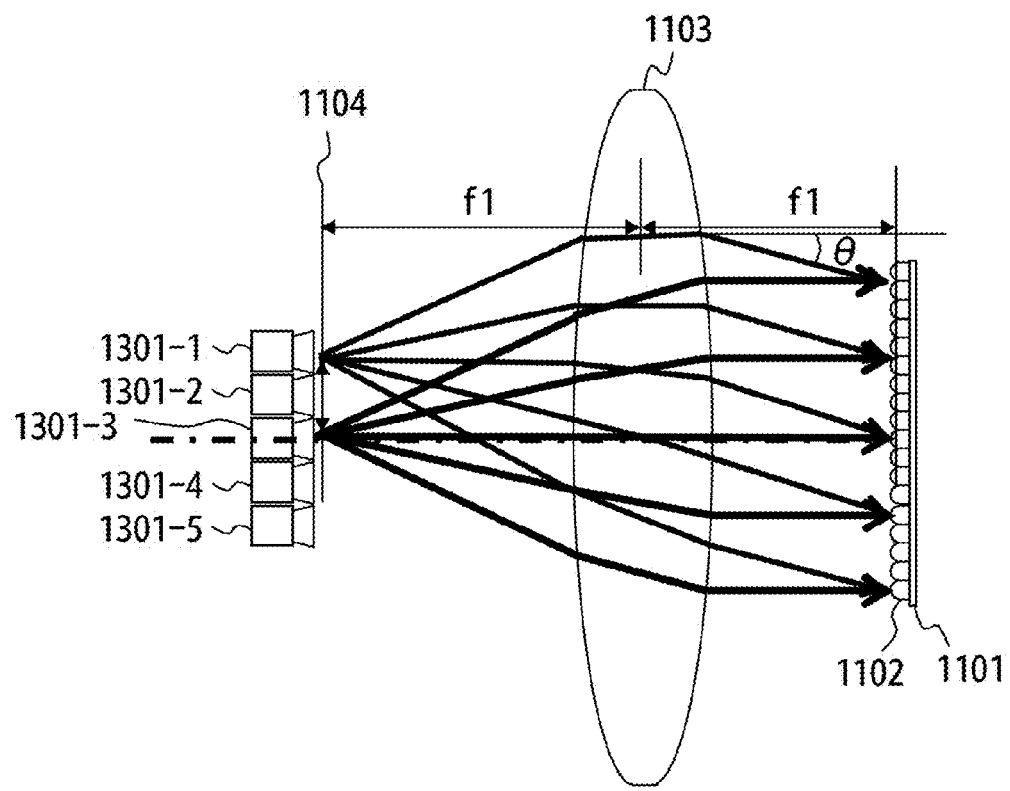
FIG. 13 illustrates a plurality of virtual cameras.

FIG. 13 illustrates a plurality of virtual cameras which are placed at the observation position 1104 in FIG. 11. Referring to FIG. 13, the distance between the observation position 1104 and the eyepiece lens 1103 coincides with the focal length f1 of the eyepiece lens 1103. In addition, the distance between the lenticular lens 1102 and the eyepiece lens 1103 coincides with the focal length f1.

Virtual cameras 1301-1 to 1301-5 are placed in parallel at the observation position 1104. It is conceivable in this case that by reversely tracing a light ray reaching each virtual camera to project an image shot by the virtual camera onto the display surface of the display 1101, the same light ray state as obtained when a three-dimensional object is actually observed is reproduced before eyes of an observer. When the lens-to-lens distance between the eyepiece lens 1103 and the lenticular lens 1102 changes, the trajectories of light rays also change. The inventors have found that the pixel values of pixels of the display 1101 can be adapted to an optical system layout by taking into consideration the lens-to-lens distance.

FIG. 14 illustrates the relationship between the position of a virtual image corresponding to a viewpoint image and the lens-to-lens distance between the lenticular lens 1102 and the eyepiece lens 1103. A virtual image position 1401 is separated from an observation position 1402 by a distance Dv. Letting k be the magnification of a virtual image, the distance Dv is k times the focal length f1 of the eyepiece lens 1103. If the distance between the observation position 1402 and the eyepiece lens 1103 is equal to the focal length f1, the distance between the virtual image position 1401 and the eyepiece lens 1103 is (k−1)·f1.

In this case, according to the lens equation, an ideal value D of a lens-to-lens distance d between the eyepiece lens 1103 and the lenticular lens 1102 is given by the following expression:

$$1/f1 = 1/D - 1/\{(k-1) \cdot f1\}$$

$$D = (1 - 1/k) \cdot f1 \quad (1)$$

Figure 15:
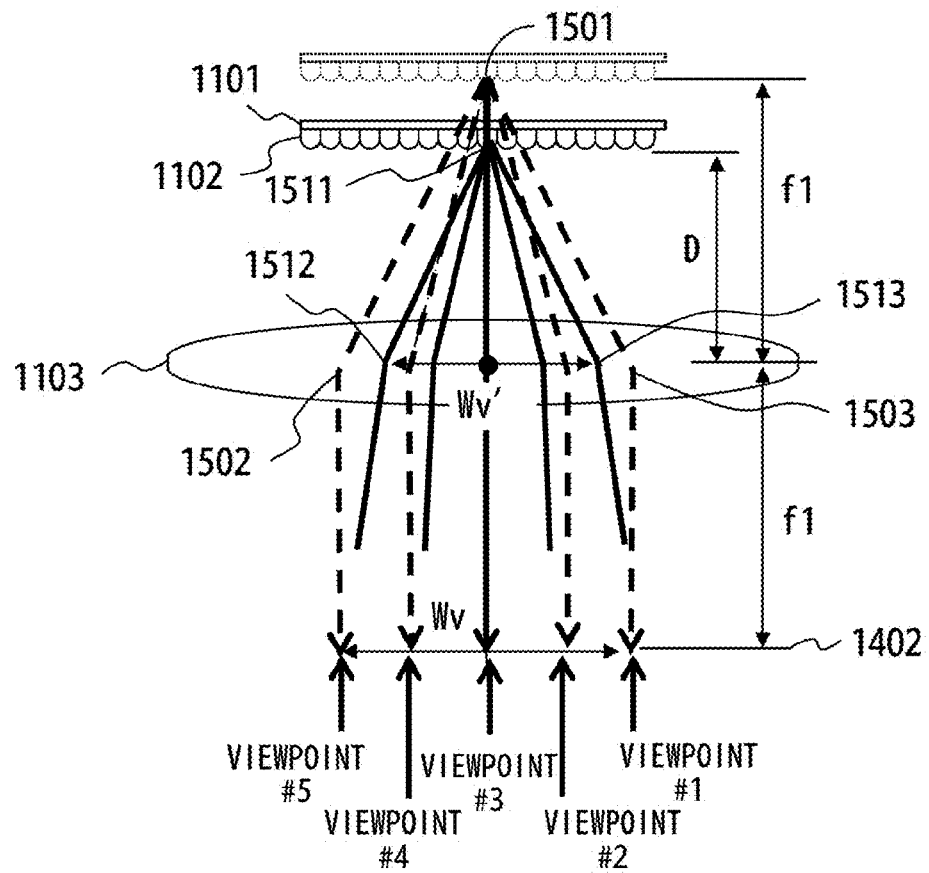
FIG. 15 illustrates a viewing area at the position of the eyepiece lens.

FIG. 15 illustrates a viewing area at the position of the eyepiece lens 1103. The viewing area at the position of the eyepiece lens 1103 is expressed by a spreading width Wv' of five light rays between the lenticular lens 1102 and viewpoints #1 to #5 at the observation position 1402, as indicated by solid lines.

If D=f1, five light rays between the eyepiece lens 1103 and viewpoints #1 to #5 are parallel, and the spreading width Wv' is equal to a spreading width Wv of light rays at the observation position 1402, as indicated by broken lines.

If D<f1, the following expression is derived from the geometrical similarity between a triangle having a point 1501, a point 1502, and a point 1503 as vertices and a triangle having a point 1511, a point 1512, and a point 1513 as vertices and Expression (1):

$$Wv' = (D/f1) \cdot Wv \quad (2)$$
$$= (1 - 1/k) \cdot Wv$$

Figure 16:
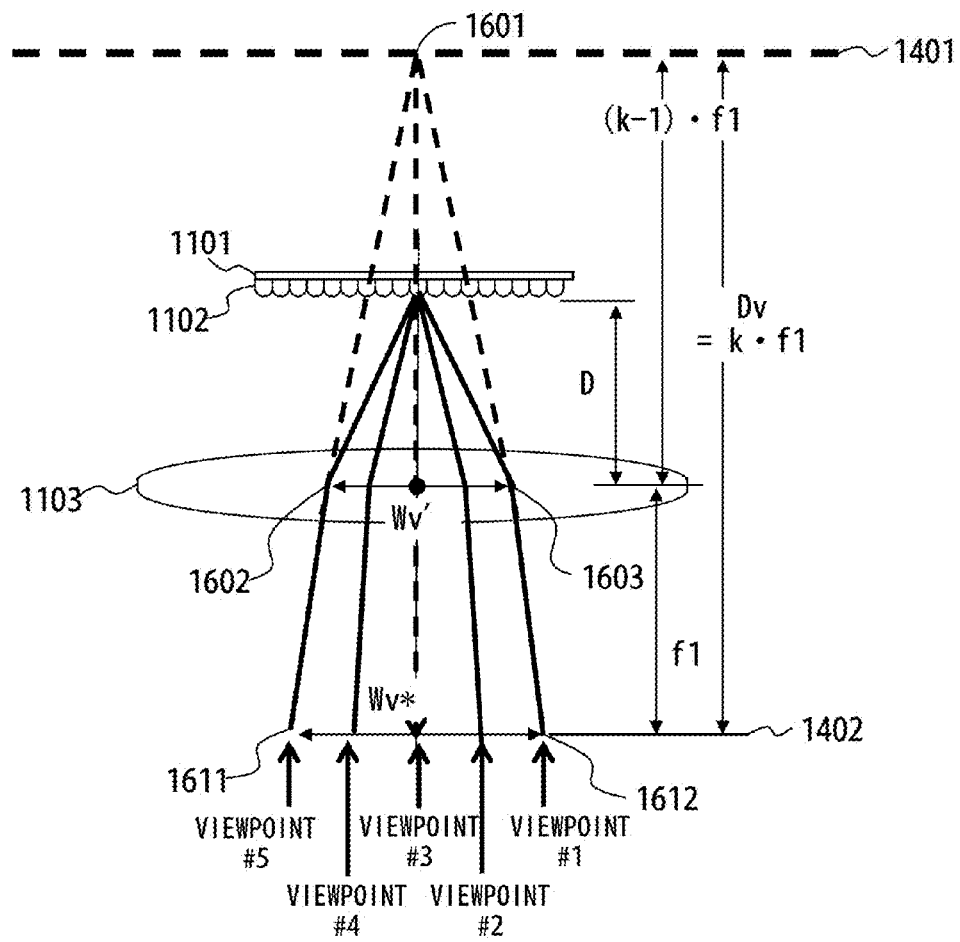
FIG. 16 illustrates a viewing area at an observation position.

How wide a spreading width increasing from the spreading width Wv' becomes at the observation position 1402 will be considered. As illustrated in FIG. 16, the directions of light rays are equal to the directions of light rays from a point light source which is placed on a point 1601 at the virtual image position 1401. Since a triangle having the point 1601, a point 1602, and a point 1603 as vertices and a triangle having the point 1601, a point 1611, and a point 1612 as vertices are geometrically similar, a spreading width Wv* of light rays at the observation position 1402 is given by the following expression:

$$Wv^* = \{k/(k-1)\} \cdot Wv' \quad (3)$$

Substitution of Expression (2) into Wv' in Expression (3) gives the following expression:

$$Wv^* = \{k/(k-1)\} \cdot (1 - 1/k) \cdot Wv \quad (4)$$
$$= Wv$$

It can be seen from Expression (4) that the spreading width Wv* is equal to the spreading width Wv when D=f1, regardless of the magnification k.

Figure 17:
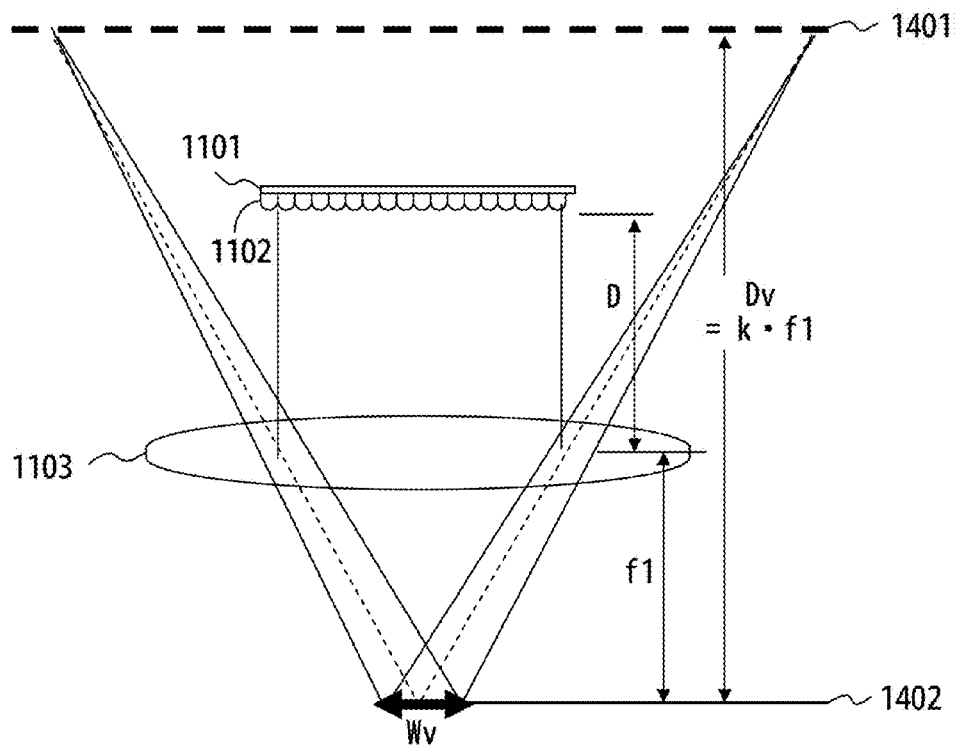
FIG. 17 illustrates generation of a multi-viewpoint image.

It can be seen from the above consideration that a multi-viewpoint image suited to an optical system layout can be generated by placing a virtual screen at the virtual image position 1401 separated from the observation position 1402 by the distance Dv and generating a multi-viewpoint image which is obtained through observation with a viewing area having the width Wv regardless of the lens-to-lens distance D, as illustrated in FIG. 17. Such a multi-viewpoint image is generated by virtual cameras which are arranged to fit in the width Wv. If D=f1, an image which is shot while the cameras are placed such that the optical axes are parallel is used. If D<f1, an image which is shot while the cameras are placed such that the optical axes converge at the distance Dv is used.

A pixel value to be assigned to each pixel of the display 1101 will be discussed on the basis of the consideration result. In the foregoing consideration result, an angle of convergence of cameras is included in a viewpoint image as a parameter. In contrast, cameras here are assumed to be placed in parallel, and expression with a unified parameter, a direction in which a light ray enters a camera, is adopted. Note that the actual lens-to-lens distance d is used instead of the ideal value D of the lens-to-lens distance d between the eyepiece lens 1103 and the lenticular lens 1102 in the following consideration.

Figure 18:
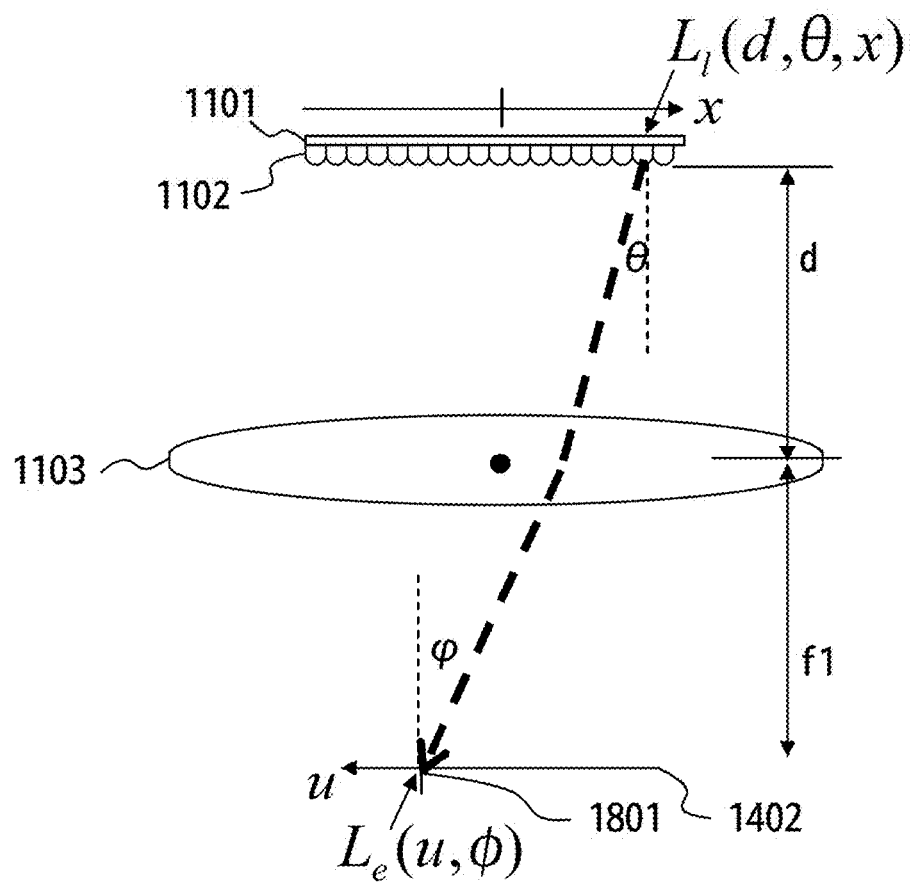
FIG. 18 illustrates the relationship between an emission direction of a light ray and an incident direction of a light ray.

FIG. 18 illustrates the relationship between an emission direction of a light ray emitted from the lenticular lens 1102 and an incident direction of a light ray at a viewpoint 1801 on the observation position 1402. A multi-viewpoint optical system including the display 1101 and the lenticular lens 1102 is placed at a position separated from the eyepiece lens 1103 by the distance d, and an x-axis is provided to extend in a direction from left toward right on the display surface of the display 1101. The origin of the x-axis corresponds to the intersection of the optical axis of the eyepiece lens 1103 and the display surface of the display 1101, and a coordinate x indicates the position of each element lens of the lenticular lens 1102. The position of each element lens may be referred to as a pitch position hereinafter.

A u-axis is provided to extend in a direction from right toward left at the observation position 1402. The origin of the u-axis is the intersection of the optical axis of the eyepiece lens 1103 and a plane at the observation position 1402, and a coordinate u indicates the position of the viewpoint 1801 at the observation position 1402.

Figure 19:
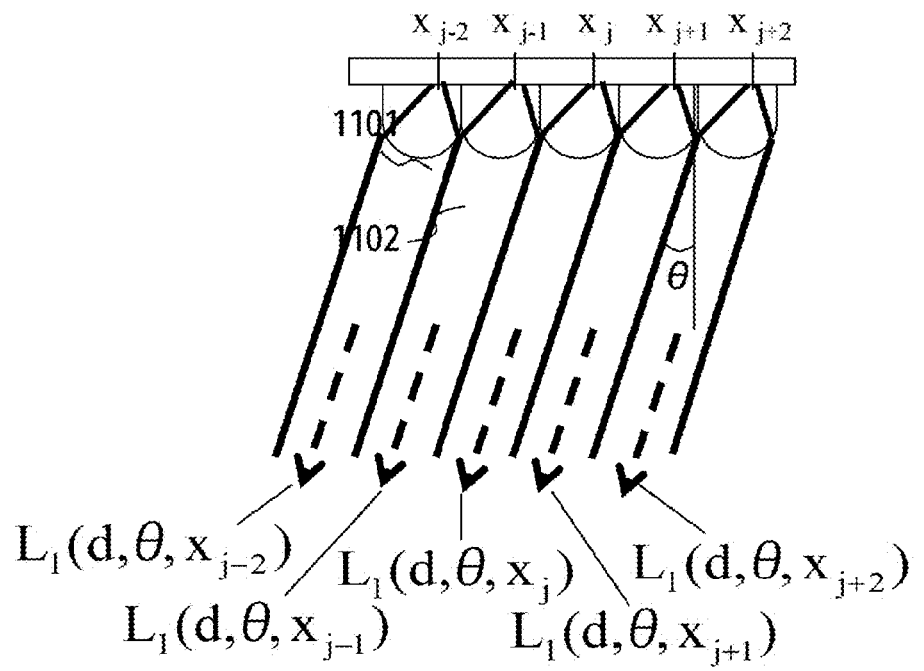
FIG. 19 illustrates a pitch position of the lenticular lens.

Here, a light ray emitted from the pitch position x in an emission direction of the angle $\theta$ is denoted by $L_l(d, \theta, x)$, and a light ray incident at the viewpoint position u in an incident direction of an angle $\phi$ is denoted by $L_e(u,\phi)$. As illustrated in FIG. 19, a light ray emitted in the angle $\theta$ from a j-th (j=1 to M) element lens at a pitch position $x_j$ of the lenticular lens 1102 is denoted by $L_l(d,\theta,x_j)$.

Figure 20:
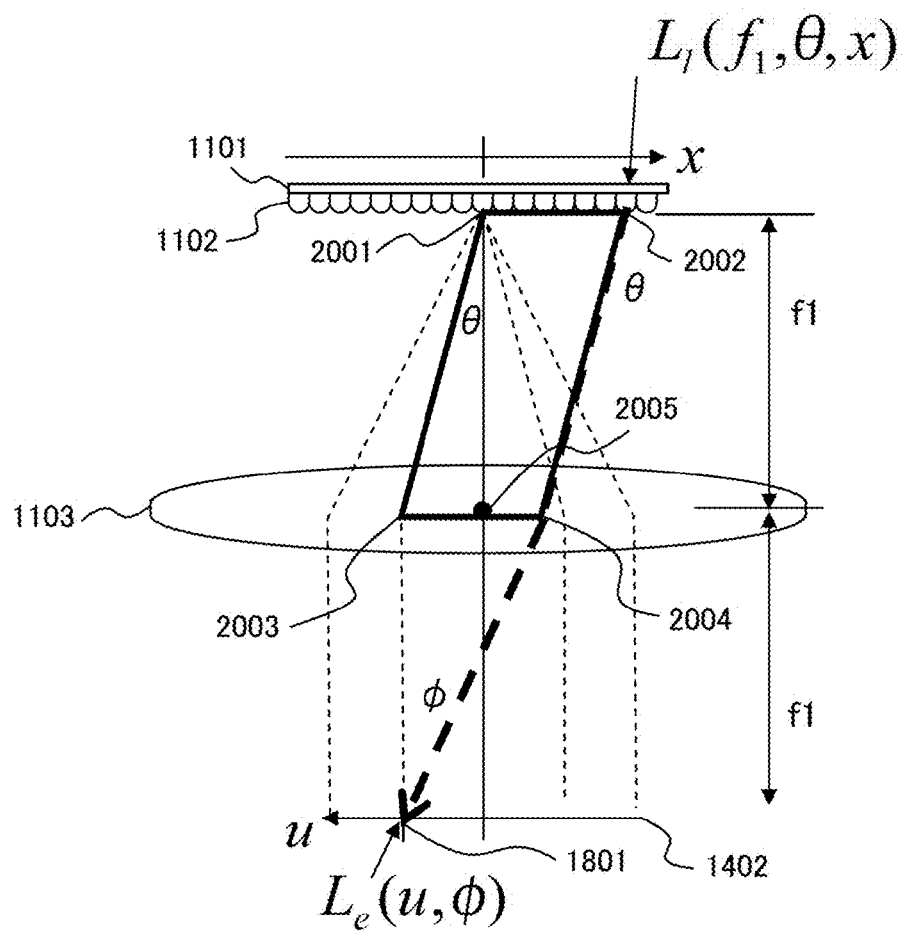
FIG. 20 illustrates the trajectory of a light ray when $d=f1$.

If d=f1, focusing on a right triangle having a point 2001, a point 2003, and a point 2005 as vertices, as illustrated in FIG. 20 gives the following expression:

$$u = f1 \cdot \tan \theta \qquad (5)$$

Focusing on a right triangle having the point 1801, the point 2003, and a point 2004 as vertices and a parallelogram having the point 2001, a point 2002, the point 2003, and the point 2004 as vertices gives the following expression:

$$x = f1 \cdot \tan \phi \qquad (6)$$

The following expression is thus derived from the trajectory of a light ray indicated by a dashed arrow from the point 2004 toward the point 1801:

$$L_l(f1,\theta,x) = L_e(f1 \cdot \tan \theta, \arctan(x/f1)) \qquad (7)$$

For this reason, a pixel value corresponding to a light ray incident in the angle $\phi$ represented by Expression (6) at the viewpoint position u represented by Expression (5) may be given to a pixel corresponding to a light ray emitted in the angle $\theta$ from the pitch position x.

If d<f1, Expression (5) holds for the relationship between the viewpoint position u and the angle $\theta$, regardless of the lens-to-lens distance d. This is because the viewpoint position u is determined by the emission direction of a light ray from the lenticular lens 1102. Thus, the following expression holds:

$$L_l(d,\theta,x) = L_e(f1 \cdot \tan \theta, \phi) \qquad (8)$$

If d<f1, five light rays emitted from the center of the lenticular lens 1102 do not become parallel and spread even after passing through the eyepiece lens 1103, as indicated by solid lines in FIG. 21. For this reason, although the viewpoint position u does not change depending on the lens-to-lens distance d, a spread angle of light rays changes depending on the lens-to-lens distance d. The spread angle is equal to a spread angle of light rays from the point light source placed at the point 1601 on the virtual image position 1401.

Letting $\Delta\phi$ be a spread angle of light rays from the point light source placed at the point 1601, as illustrated in FIG. 22, an angle left after the spread angle $\Delta\phi$ is subtracted from the incident angle $\phi$ is related to the pitch position x.

Since the length of a side connecting a point 2201 and a point 2202 of four sides of a parallelogram having the point 2201, the point 2202, a point 2203, and a point 2204 as vertices is x, the length of a side connecting the points 2203 and 2204 is also x. Focusing on a right triangle having the point 1801, a point 2205, and the point 2204 as vertices and a right triangle having the viewpoint 1801, the point 2205, and the point 2203 in this case gives the following expression:

$$x = f1 \cdot \tan \phi - f1 \cdot \tan \Delta\phi \qquad (9)$$

Substitution of $\tan \Delta\phi = u/(k \cdot f1)$, $u = f1 \cdot \tan \theta$, and $k = f1/(f1-d)$ into Expression (9) gives the following expression:

$$x = f1 \cdot [\tan \phi - \{(f1-d)/f1\} \cdot \tan \theta] \qquad (10)$$

According to Expression (10), the incident angle $\phi$ is given by the following expression:

$$\phi = \arctan [\{x + (f1-d) \cdot \tan \theta\}/f1] \qquad (11)$$

As discussed above, a light ray emitted in the angle $\theta$ from the pitch position x when d<f1 is given by Expressions (8) and (11) using a light ray incident at a viewpoint position. It can thus be seen that a light ray to be displayed by a pixel corresponding to a light ray emitted in the angle $\theta$ from the pitch position x is determined on the basis of four parameters, the pitch position x, the emission angle $\theta$, the focal length f1, and the lens-to-lens distance d. The viewpoint position u of the light ray is determined on the basis of the emission angle $\theta$ and the focal length f1, and the incident angle $\phi$ is determined on the basis of the pitch position x, the emission angle $\theta$, the focal length f1, and the lens-to-lens distance d.

Note that since a virtual image cannot be observed through the eyepiece lens 1103 in a case where d>f1, the case is excluded from discussion.

The operation of the output circuit 411 in FIG. 7 of selecting each pixel included in each element pixel from among pixels of N viewpoint images on the basis of Expressions (8) and (11) will be described.

FIG. 23 is a flow chart showing an example of the operation of the output circuit 411. The operation of the image selecting circuit 711 and the pixel selecting circuit 712 for a left eye will be described here as an example.

The control circuit 804 of the image selecting circuit 711 first calculates the viewpoint position u on the basis of Expression (5) for each of N emission angles $\theta$ corresponding to N viewpoint images (step 2301). The control circuit 804 outputs a control signal for selecting a viewpoint image corresponding to each obtained viewpoint position u to the switching circuits 803-1 to 803-N. With this operation, the viewpoint image corresponding to each emission angle $\theta$ is output from the image selecting circuit 711 to the pixel selecting circuit 712.

The light ray direction selection circuit 901 of the pixel selecting circuit 712 calculates the incident angle φ on the basis of Expression (11) for each of combinations of one of M pitch positions x and one of the N emission angles θ (step 2302). The light ray direction selection circuit 901 outputs the information of a light ray direction indicated by each obtained incident angle φ to the pixel value determining circuit 902.

The pixel value determining circuit 902 selects a pixel corresponding to the light ray direction output from the light ray direction selection circuit 901 from the viewpoint image output from the image selecting circuit 711 and outputs the pixel value of the pixel to the display 511 (step 2303). More specifically, the pixel value determining circuit 902 determines a pixel value to be output by associating the incident angle φ with the position of a pixel in the viewpoint image.

Figure 24:
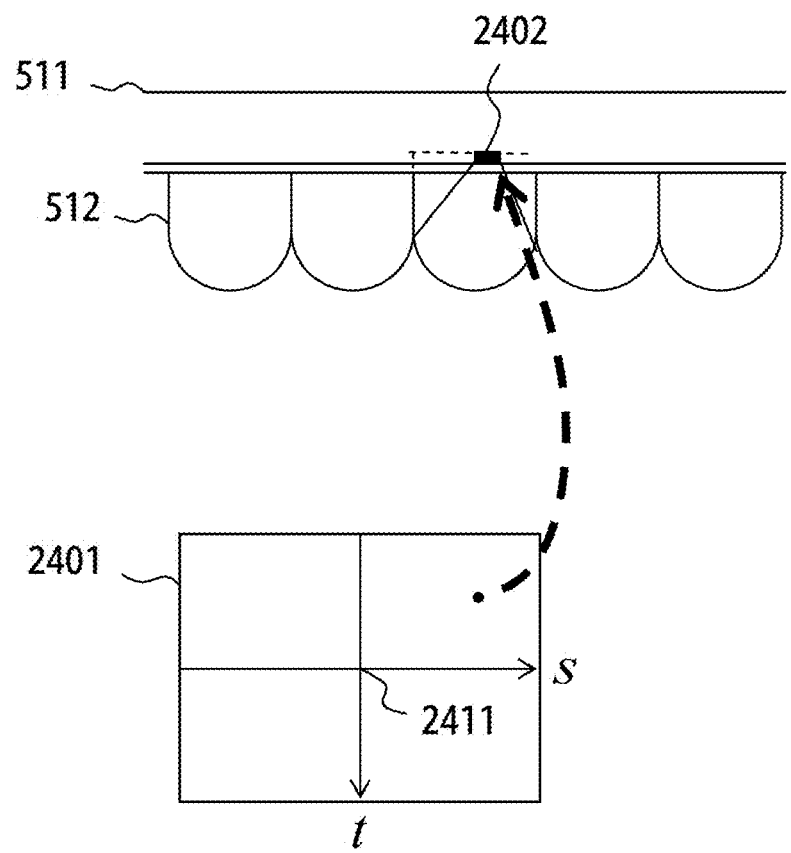
FIG. 24 illustrates the relationship between a pixel of a display and a pixel of a viewpoint image.

As illustrated in FIG. 24, the center of a viewpoint image 2401 is set as an origin 2411, coordinates in a lateral direction (horizontal direction) and in a vertical direction are denoted by s and t, respectively, and the pixel value of a pixel at a point (s,t) is denoted by C(s,t). The coordinate of the origin 2411 corresponds to the pitch position x of a center element lens, through which an optical axis of the eyepiece lens 513 passes, of element lenses of the lenticular lens 512, as illustrated in FIG. 10. The coordinate t of the origin 2411 corresponds to the position of the origin of the x-axis in FIG. 18 on the display surface of the display 511.

Letting $\psi_H$ be the horizontal angle of view of a virtual camera which is to generate the viewpoint image 2401, and $W_H$ be a horizontal resolution, the relationship between the coordinates and the incident angle φ is given by the following expression:

$$s = \{\tan \phi / \tan(\psi_H/2)\} \cdot W_H/2 \qquad (12)$$

The coordinate t coincides with a vertical coordinate on the display surface of the display 511, regardless of the incident angle φ. The pixel value determining circuit 902 calculates the point (s,t) on the viewpoint image 2401 corresponding to a pixel 2402 of the display 511 on the basis of Expression (12) and outputs the pixel value C(s,t) of the pixel at the position as the pixel value of the pixel 2402 to the display 511. By performing the above-described operation for each of combinations of one of the emission directions θ, one of the pitch positions x, and one of values of a vertical coordinate of the display 511, the pixel values of all pixels included in all element pixels are determined, and a multi-viewpoint image is generated.

Note that if the horizontal angle $\psi_H$ of view coincides with an observation angle of view for the display 511 at the observation position 1402 and the number of pixels of the display 511 coincides with the number of pixels of a viewpoint image when Expression (12) is to be applied, association is easy. The angle of view and the number of pixels can be made to coincide by appropriately trimming and scaling a viewpoint image.

The operation of the image selecting circuit 721 and the pixel selecting circuit 722 is similar to the operation of the image selecting circuit 711 and the pixel selecting circuit 712.

Expression (11) means that a pixel selection logic changes according to the values of two parameters as hardware requirements, the lens-to-lens distance d and the focal length f1, if tan θ is not 0. These two parameters generally take prescribed values at the time of hardware configuration. As the lens-to-lens distance d becomes smaller than the focal length f1, the incident angle φ becomes larger. According to Expression (12), as the incident angle φ becomes larger, the value of the coordinate s becomes larger. According to a selection logic based on Expressions (11) and (12), as the lens-to-lens distance d becomes smaller than the focal length f1, a pixel at a position more distant from the origin along the lateral direction in the viewpoint image 2401 is selected. This allows generation of a multi-viewpoint image suited to the lens-to-lens distance d.

Note that a selection logic for selection of a pixel from the viewpoint image 2401 is not limited to the selection logic based on Expressions (11) and (12). Any other selection logic may be used as long as the selection logic is to select a pixel at a position more distant from the origin along the lateral direction in the viewpoint image 2401 as the lens-to-lens distance d becomes smaller than the focal length f1.

When the HMD 501 is manufactured, there is a tolerance in the dimensions of the enclosure 502 or the like. Tolerance conditions allowed for an optical system layout of the HMD 501 will be considered.

FIGS. 25A and 25B illustrate optical paths of light rays formed by the display 1101, the lenticular lens 1102, and the eyepiece lens 1103. As illustrated in FIG. 25A, the role of the lenticular lens 1102 is to control the emission angle θ of each of light rays emitted as parallel light from pixels located on the display surface of the display 1101 according to the amount Δx of deviation from the center position of each element lens.

Focusing on a right triangle indicated by a bold line in FIG. 25A gives the relationship between the amount Δx of deviation and the emission angle θ as the following expression:

$$\Delta x = f0 \cdot \tan \theta \qquad (13)$$

In Expression (13), f0 is the focal length of each element lens of the lenticular lens 1102. As illustrated in FIG. 25B, the role of the eyepiece lens 1103 is to condense parallel light incident in the angle θ onto a position deviated from the optical axis of the eyepiece lens 1103 by the amount u of displacement, according to the angle θ. Focusing on a right triangle indicated by a bold line in FIG. 25B gives the relationship between the angle θ and the amount u of displacement as Expression (5) described above.

Observation from the observation position 1402 separated from the eyepiece lens 1103 by the focal length f1 allows an observer to observe a viewpoint image which is formed by parallel light emitted from the lenticular lens 1102 as a virtual image through the eyepiece lens 1103.

FIGS. 26A and 26B illustrate the relationship between the width of each element lens of the lenticular lens 1102 and an observation viewing area. Assuming the view angle of the lenticular lens 1102 is 2α, the maximum value of the emission angle θ of a light ray is α. As illustrated in FIG. 26A, letting p be the width of each element lens of the lenticular lens 1102, the length of the base of a right triangle indicated by a bold line is p/2. From this, the following expression holds:

$$p/2 = f0 \cdot \tan \alpha \qquad (14)$$

Letting Wv be the spreading width of light rays at the observation position 1402, as illustrated in FIG. 26B, the length of the base of a right triangle indicated by a bold line is Wv/2. From this, the following expression holds:

$$Wv/2 = f1 \cdot \tan \alpha \qquad (15)$$

Elimination of tan α from Expressions (14) and (15) gives the following expression:

$$Wv = (f1/f0) \cdot p \qquad (16)$$

Since the spreading width Wv corresponds to an observation viewing area, Expression (16) represents the relationship between the width of each element lens of the lenticular lens 1102 and an observation viewing area.

A condition for the lens-to-lens distance d will be derived. FIGS. 27A and 27B illustrate an ideal state and an allowable limit, respectively, for light rays for a plurality of viewpoint images emitted from a single element lens of the lenticular lens 1102. In the ideal state illustrated in FIG. 27A, light rays emitted from pixels for the viewpoint images pass through the center of the element lens. In contrast, as for the allowable limit illustrated in FIG. 27B, a light ray emitted from an outermost one of the pixels corresponding to the element lens passes through an edge position of the element lens.

Figures 28A, 28B:
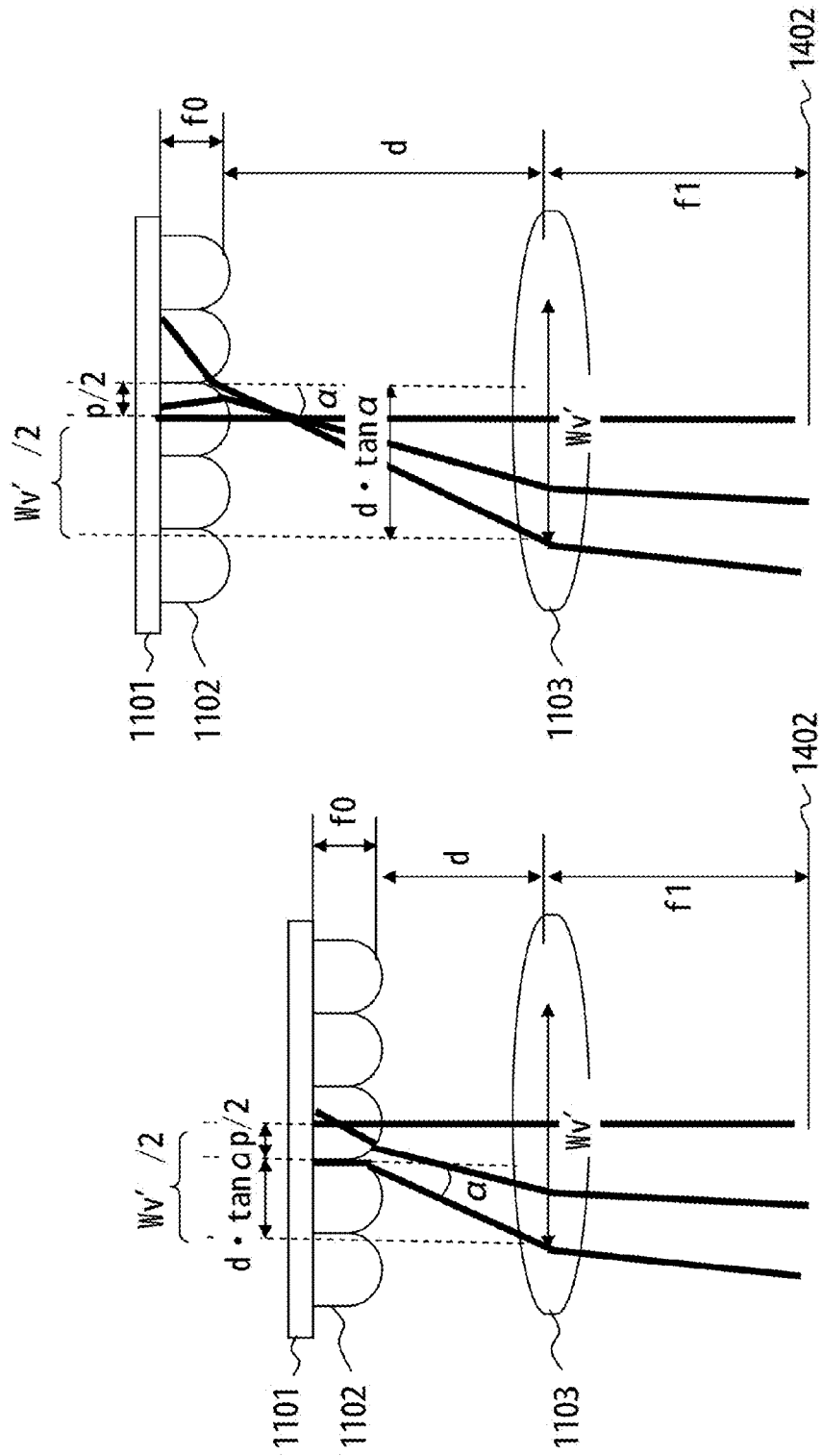
FIG. 28A and FIG. 28B illustrate the relationship between the lens-to-lens distance and the spreading width of light rays.

FIGS. 28A and 28B illustrate the relationship between the lens-to-lens distance d and the spreading width Wv' at the position of the eyepiece lens 1103 in an allowable limit state. In a first case illustrated in FIG. 28A, a light ray emitted at the maximum value $\alpha$ of the emission angle $\theta$ from the lenticular lens 1102 enters the eyepiece lens 1103 at a position deviated from an element lens, from which the light ray is emitted, by $d \cdot \tan \alpha$. Following the trajectory of a light ray from an end point of an observation viewing area at the observation position 1402 in a manner as indicated by a bold line, the trajectory deviates by that amount and reaches the lenticular lens 1102. The trajectory of the light ray does not matter if the trajectory reaches a correct element lens but matters if the trajectory reaches an adjacent element lens.

A condition for the trajectory of a light ray to reach a correct element lens is given by the following expression:

$$Wv'/2 - d \cdot \tan \alpha \leq p/2 \qquad (17)$$

Elimination of $\tan \alpha$ from Expression (17) by using Expression (15) gives the following expression:

$$Wv'/2 - (Wv/2) \cdot (d/f1) \leq p/2 \qquad (18)$$

Substitution of Expression (2) into Wv' in Expression (18) gives the following expression:

$$(1 - 1/k) \cdot (Wv/2) - (Wv/2) \cdot (d/f1) \leq p/2 \qquad (19)$$

Multiplication of both sides of Expression (19) by 2/Wv gives the following expression:

$$1 - 1/k - d/f1 \leq p/Wv \qquad (20)$$

Rewriting of the right side of Expression (20) by using Expression (16) gives the following expression:

$$1 - 1/k - d/f1 \leq f0/f1$$

$$(1 - 1/k) \cdot f1 - d \leq f0 \qquad (21)$$

From Expression (1) and Expression (21), the following expression is derived:

$$d \geq D - f0 \qquad (22)$$

In a second case illustrated in FIG. 28B, a condition for the trajectory of a light ray to reach a correct element lens is given by the following expression:

$$d \cdot \tan \alpha - Wv'/2 \leq p/2 \qquad (23)$$

Deformation of Expression (23) in the same manner as for Expression (17) gives the following expression:

$$d \leq D + f0 \qquad (24)$$

According to Expressions (22) and (24), a condition for the lens-to-lens distance d is given by the following expression:

$$D - f0 \leq d \leq D + f0 \qquad (25)$$

As can be seen from Expression (25), a tolerance for the lens-to-lens distance d is desirably not more than twice the focal length f0 of each element lens of the lenticular lens 1102. The condition d f1 is added to observe a virtual image. Thus, the upper limit for the lens-to-lens distance d is a smaller one of f1 and D+f0.

Figure 29:
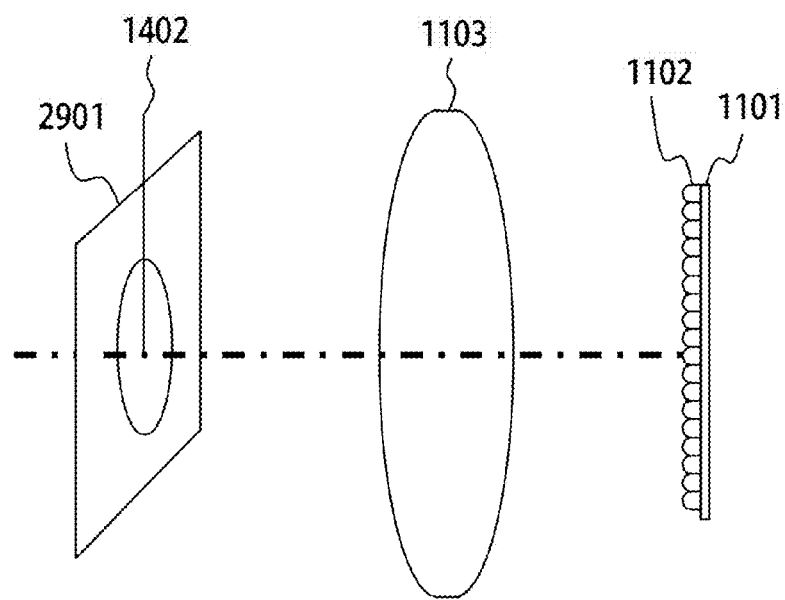
FIG. 29 illustrates a slit for observation.

FIG. 29 illustrates a slit 2901 for observation which is provided at the observation position 1402. The size of an opening of the slit 2901 is desirably determined on the basis of the spreading width Wv in Expression (16). For example, if the shape of the opening is a circle centered at the intersection of the plane at the observation position 1402 and the optical axis of the eyepiece lens 1103, $(f1/f0) \cdot p$ can be used as the diameter of the circle. An observer can block excessive light arriving at the observation position 1402 by observing a multi-viewpoint image through the slit 2901.

Although the configuration and operation of an image display apparatus have been described in the above embodiment by taking the HMD 501 in FIG. 5 as an example, the configuration of an image display apparatus is not limited to the configuration illustrated in FIGS. 5 to 9. Some components of the configuration illustrated in FIGS. 5 to 9 may be omitted or changed according to the purpose and conditions of an image display apparatus. The flow chart in FIG. 23 is merely one example, and some processes may be omitted or changed according to the configuration and conditions of an image display apparatus.

For example, it is also possible to provide the output circuit 411 inside an enclosure different from the enclosure 502 and connect the output circuit 411 and the displays 511 and 521 by communication lines, instead of providing the output circuit 411 inside the enclosure 502 like the displays 511 and 521.

If two optical systems for left and right eyes need not be provided, one of the two optical systems can be omitted. If the resolution of a viewpoint image need not be reduced to 1/N, the downsampling circuits 802-1 to 802-N in FIG. 8 can be omitted.

Elimination of the incident angle $\phi$ from Expression (12) by using Expression (11) gives the following expression:

$$s = [\{x + (f1 - d) \cdot \tan \theta\} / \{f1 \cdot \tan(\psi_H/2)\}] \cdot W_H/2 \qquad (26)$$

The pixel value determining circuit 902 in FIG. 9 can also directly calculate, on the basis of Expression (26), the coordinate s of the viewpoint image 2401 without calculating the incident angle $\phi$ and select a corresponding pixel. If a selection logic based on Expression (26) is used, the light ray direction selection circuit 901 in FIG. 9 and the process in step 2302 in FIG. 23 can be omitted.

If an image display apparatus is used not as the HMD 501, a different shape may be adopted as the shape of the enclosure 502 illustrated in FIGS. 5 and 6. An image display apparatus according to the embodiment can be used to display not only a moving image but also a still image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image display apparatus comprising:
a display that displays a composite image including a plurality of element pixels, each of the plurality of element pixels being formed by arranging, in a direction, a first plurality of pixels respectively extracted from a plurality of images having a plurality of viewpoints different from each other;
a first optical element including a plurality of lenses that are arrayed in the direction to correspond to the plurality of element pixels, the plurality of lenses emitting in parallel a plurality of light rays emitted from a second plurality of pixels respectively included in the plurality of element pixels, for a particular image of the plurality of images;
a second optical element, with a focal length f1, which condenses the plurality of light rays emitted from the first optical element; and
an output circuit that selects a pixel of the particular image which is included in a particular element pixel of the plurality of element pixels on the basis of a selection logic to select a pixel at a first position in the particular image and outputs a pixel value of the selected pixel to the display,
wherein the output circuit includes a pixel selecting circuit that selects the pixel of the particular image on the basis of a logic in which a distance between the first position and a second position in the particular image corresponding to an optical axis of the second optical element becomes greater as a difference between the focal length of the second optical element and an element-to-element distance becomes greater and by using the difference, a distance along the direction from a first lens to a second lens of the plurality of lenses in the first optical element, an emission direction in which the plurality of light rays are emitted from the first optical element, and the focal length of the second optical element, the first lens corresponding to the optical axis of the second optical element and the second lens corresponding to the particular element pixel,
wherein the element-to-element distance, d, is a distance between the first optical element and the second optical element,
wherein for the case of d=f1 the distance x is determined by:

$$x = f1 \tan \phi$$

and for the case of d<f1 the first position is determined by:

$$x = f1\left[\tan\phi - \left(\frac{f1-d}{f1}\right)\tan\theta\right]$$

where $\phi$ is an incident angle representing an incident direction and $\theta$ is an emission angle representing the emission direction, and
wherein the display emits a light ray indicating the pixel value of the selected pixel to a lens that is one of the plurality of lenses and that corresponds to the particular element pixel.

2. The image display apparatus according to claim 1, wherein the output circuit includes an image selecting circuit that selects the particular image from among the plurality of images on the basis of the focal length of the second optical element and the emission direction.

3. The image display apparatus according to claim 1, wherein a tolerance for the element-to-element distance is not more than twice a focal length of the second lens.

4. An image display method utilizing a first optical element and a second optical element, the image display method comprising:
selecting a pixel of a particular image of a plurality of images having a plurality of viewpoints different from each other, wherein the pixel is included in a particular element pixel of a plurality of element pixels, each of the plurality of element pixels being formed by arranging, in a direction, a first plurality of pixels respectively extracted from the plurality of images, on the basis of a selection logic to select a pixel at a first position in the particular image in order to display a composite image including the plurality of element pixels;
outputting a pixel value of the selected pixel to a display;
displaying the composite image by using the display;
emitting in parallel a plurality of light rays emitted from a second plurality of pixels respectively included in the plurality of element pixels, for the particular image by using a plurality of lenses included in the first optical element and arrayed in the direction to correspond to the plurality of element pixels; and
condensing the plurality of light rays emitted from the first optical element by using the second optical element, with a focal length f1,
wherein the selecting selects the pixel of the particular image on the basis of a logic in which a distance between the first position and a second position in the particular image corresponding to an optical axis of the second optical element becomes greater as a difference between the focal length of the second optical element and an element-to-element distance becomes greater and by using the difference, a distance, x, along the direction from a first lens to a second lens of the plurality of lenses in the first optical element, an emission direction in which the plurality of light rays are emitted from the first optical element, and the focal length of the second optical element, the first lens corresponding to the optical axis of the second optical element and the second lens corresponding to the particular element pixel,
wherein the element-to-element distance, d, is a distance between the first optical element and the second optical element,
wherein for the case of d=f1 the distance x is determined by:

$$x = f1 \tan \phi$$

and for the case of d<f1 the first position is determined by:

$$x = f1\left[\tan\phi - \left(\frac{f1-d}{f1}\right)\tan\theta\right]$$

where $\phi$ is an incident angle representing an incident direction and $\theta$ is an emission angle representing the emission direction,
and wherein the displaying emits a light ray indicating the pixel value of the selected pixel to a lens that is one of the plurality of lenses and that corresponds to the particular element pixel.

* * * * *